United States Patent
Doshi et al.

(10) Patent No.: US 10,564,972 B1
(45) Date of Patent: Feb. 18, 2020

(54) APPARATUS AND METHOD FOR EFFICIENTLY RECLAIMING DEMOTED CACHE LINES

(71) Applicant: Intel Corporation, Santa Clara, CA (US)

(72) Inventors: Kshitij Doshi, Tempe, AZ (US); Vadim Sukhomlinov, Santa Clara, CA (US); Francesc Bernat Guim, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/147,066

(22) Filed: Sep. 28, 2018

(51) Int. Cl.
- *G06F 9/30* (2018.01)
- *G06F 12/0868* (2016.01)
- *G06F 12/0871* (2016.01)
- *G06F 12/0897* (2016.01)

(52) U.S. Cl.
CPC ...... *G06F 9/30145* (2013.01); *G06F 12/0868* (2013.01); *G06F 12/0871* (2013.01); *G06F 12/0897* (2013.01)

(58) Field of Classification Search
CPC .............................................. G06F 12/00–16
See application file for complete search history.

(56) References Cited

U.S. PATENT DOCUMENTS

| | | | | |
|---|---|---|---|---|
| 2005/0060499 A1* | 3/2005 | Gilbert | ............... | G06F 12/0811 711/144 |
| 2009/0216950 A1* | 8/2009 | McCalpin | ........... | G06F 12/0833 711/122 |
| 2016/0188474 A1* | 6/2016 | Wang | ................. | G06F 12/0842 711/119 |
| 2017/0091090 A1* | 3/2017 | Wang | ................. | G06F 12/0808 |

OTHER PUBLICATIONS

John McCalpin, "Intel's future 'CLDEMOTE' instruction", Published Feb. 18, 2019, https://sites.utexas.edu/jdm4372/2019/02/18/intels-future-cldemote-instruction/, Retrieved Sep. 26, 2019 (Year: 2019).*

* cited by examiner

*Primary Examiner* — Nicholas J Simonetti
(74) *Attorney, Agent, or Firm* — Nicholson De Vos Webster & Elliott LLP

(57) ABSTRACT

An apparatus and method for efficiently reclaiming demoted cache lines. For example, one embodiment of a processor comprises: a cache hierarchy including at least one Level 1 (L1) cache and one or more lower level caches; a decoder to decode a cache line (CL) demote instruction specifying at least a first cache line; and execution circuitry to demote the first cache line responsive to the CL demote instruction, the execution circuitry to implement a writeback operation on the first cache line if the first cache line has been modified and homed in a specified memory tier or a default memory tier specified in a register.

24 Claims, 21 Drawing Sheets

APPARATUS AND METHOD FOR EFFICIENTLY RECLAIMING DEMOTED CACHE LINES

BACKGROUND

Field of the Invention

The embodiments of the invention relate generally to the field of computer processors. More particularly, the embodiments relate to an apparatus and method for efficiently reclaiming demoted cache lines.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions) but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which.

DETAILED DESCRIPTION

Figure 1:
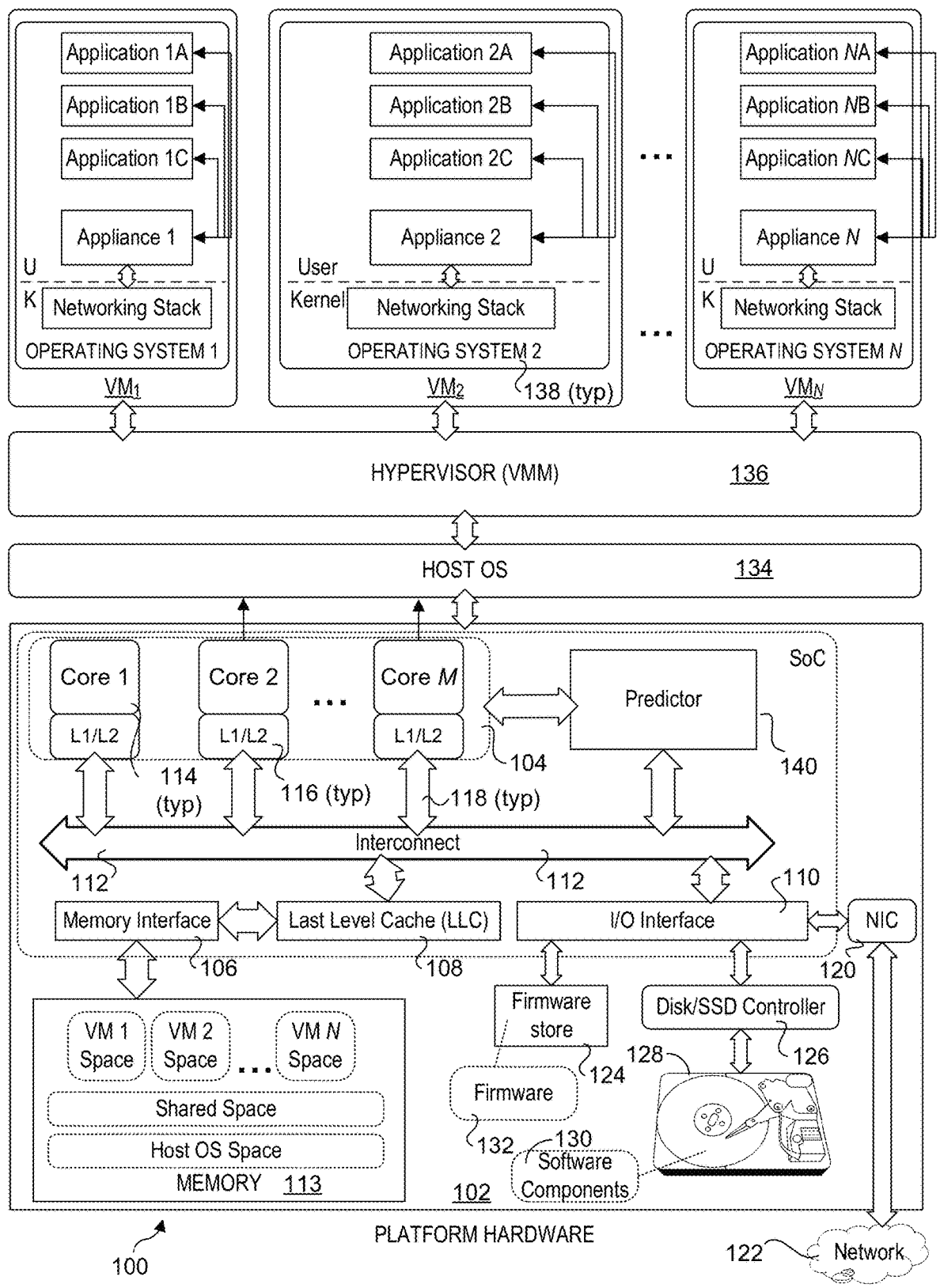
FIG. 1 is a schematic diagram illustrating an exemplary host platform configuration including platform hardware and various software-based components including NFV components.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

Processors and methods are described for managing cache tiering with gather-sector vector semantics. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, the terms "virtual appliance," "virtual network appliance," "network appliance," or simply "appliance" may be used interchangeably. In addition, for the purpose herein, including the claims, any software-based appliance relating to Software Defined Networking or configured to implement Network Function Virtualization may more generally be referred to as a "virtual appliance," with the understanding that virtual network appliances include any network appliance or virtualized entity that is configured to implement Network Function Virtualization and/or operations relating to Software Defined Networking. Accordingly, the terms virtual appliance in the following description includes all NFV appliances, as well.

FIG. 1 shows an exemplary host platform configuration 100 including platform hardware 102 and various software-based components including NFV components. Platform hardware 102 includes a central processing unit (CPU) 104 coupled to a memory interface 106, a last level cache (LLC) 108, an input/output (I/O) interface 110, and a predictor 140 via an interconnect 112. In some embodiments, all or a portion of the foregoing components may be integrated on a System on a Chip (SoC). Memory interface 106 is configured to facilitate access to system memory 113, which will usually be separate from the SoC.

CPU 104 includes a core portion including M processor cores 114, each including a local level 1 (L1) and level 2 (L2) cache 116. Optionally, the L2 cache may be referred to as a "middle-level cache" (MLC). As illustrated, each processor core 114 has a respective connection 118 to interconnect 112 and operates independently from the other processor cores.

For simplicity, interconnect 112 is shown as a single double-ended arrow representing a single interconnect structure; however, in practice, interconnect 112 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, or mesh interconnect structures.

I/O interface 110 is illustrative of various I/O interfaces provided by platform hardware 102. Generally, I/O interface 110 may be implemented as a discrete component (such as an ICH (I/O controller hub) or the like), or it may be implemented on an SoC. Moreover, I/O interface 110 may also be implemented as an I/O hierarchy, such as a Peripheral Component Interconnect Express (PCIe™) I/O hierarchy. I/O interface 110 further facilitates communication between various I/O resources and devices and other platform components. These include a Network Interface Controller (NIC) 120 that is configured to facilitate access to a network 122, and various other I/O devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 102, firmware 132 will be loaded and configured in system memory 113, followed by booting a host operating system (OS) 138. Subsequently, a hypervisor 136 (or VMM), which may generally comprise an application running on host OS 134, will be launched. Hypervisor 136 may then be employed to launch various virtual machines, VM1-N, each of which will be configured to use various portions (i.e., address spaces) of system memory 113. In turn, each virtual machine VM1-N may be employed to host a respective operating system 138$_1$-N.

During run-time operations, hypervisor 136 enables reconfiguration of various system resources, such as system memory 113, cores 114, and disk drive(s) 128. Generally, the virtual machines provide abstractions (in combination with hypervisor 136) between their hosted operating system and the underlying platform hardware 102, enabling the hardware resources to be shared among VM1-N. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 136.

As further illustrated in FIG. 1, each operating system includes a kernel space and a user space, both of which are implemented as memory spaces in system memory 113. The kernel space is protected and used to run operating system kernel components, including a networking stack. Optionally, the networking stack will be in the user space. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 102. For simplicity, each VM1-N is depicted as hosting a similar set of software applications; however, this is merely for illustrative purposes, as the VMs for a given platform may host similar applications, or may host different applications. Similarly, each VM1-N may host a single virtual network appliance (as shown), may host multiple virtual network appliances, or may not host any virtual network appliances.

Under SDN on a virtualized platform, data is passed between VMs over a virtual network. Generally, this may be implemented via virtual NICs for each VM, and a virtual switch in the hypervisor or VMM. Under a non-optimized conventional approach, the virtual switch is actually implemented in a manner similar to a physical switch, meaning the virtual switch includes input and output buffers and performs various packet flow operations. As with a physical switch, there are latencies that occur with each step of the data transfer sequence between the virtual NICs, which results in a substantial downgrade in performance.

In a virtualized environment including multiple VMs hosted on the same physical machine, the medium of communication is the memory subsystem. Therefore, expecting a very high throughput performance from the linkage of these VMs is not unrealistic. However, measurements from VMs on a typical modern server using a multitude of virtualization software reveals that the inter-VM communication performance is nowhere near what the memory subsystem could potentially achieve in terms of data throughput. For example, cloud workloads usually achieve a packet transfer rate of around one million packets per second between two VMs. Telco workloads, which typically use highly optimized software stacks and libraries, can usually achieve packet transfer rates of about ten million packets per second between two VMs.

Figure 2:
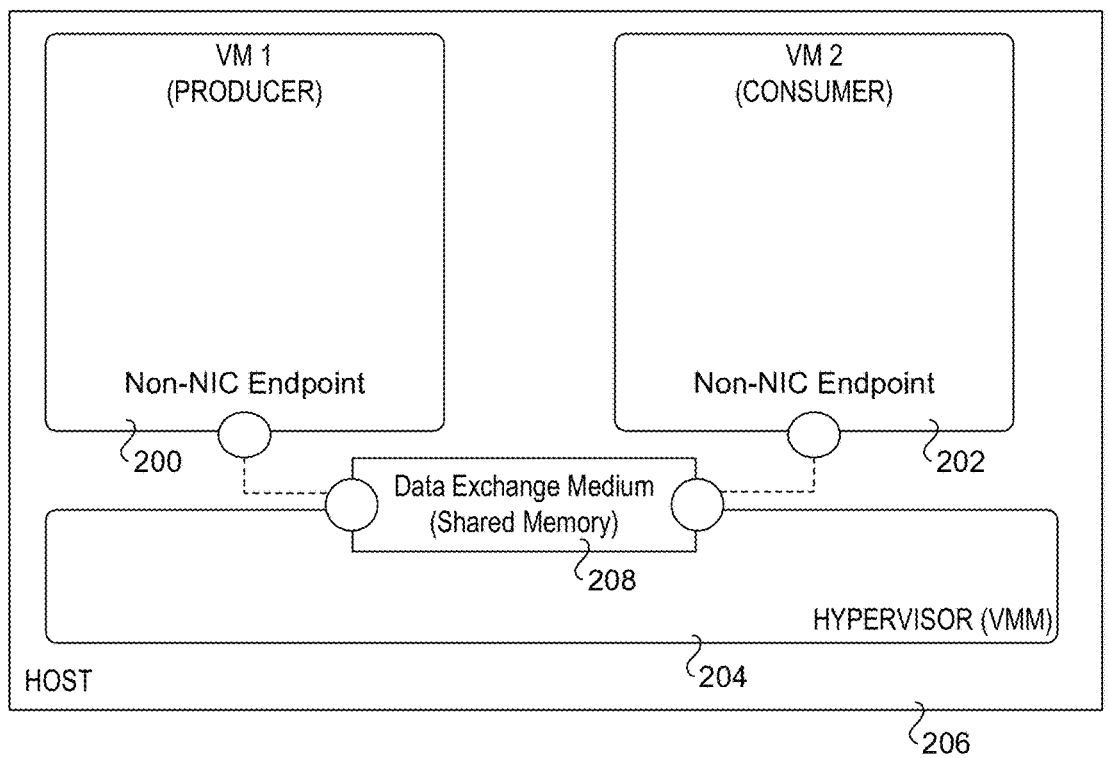
FIG. 2 is a schematic diagram illustrating a producer-consumer model employing shared memory.

The most efficient inter-VM solution currently in the art rely on a shared memory as the data medium for packet communication, as shown in FIG. 2, which depicts a pair of VMs 200 and 202 and a hypervisor 204 running on a host platform 206. VM 200 is a producer, which writes a packet into the shared memory, which comprises data exchange medium 208, while the VM 202 is a consumer that reads the packet from the shared memory. In order to keep data correctness, there is also a "ready" flag (not shown) used to guarantee the producer and consumer do not over-run each other.

As mentioned above, there is a lot of VM and network stack related software overhead involved in this case that prevents the packet throughput from reaching the bandwidth upper bound of the host platform's memory system. In order to separate the pure software overhead (which could eventually be addressed by many ongoing software optimization efforts), an IPC memory benchmark was used to emulate the inter-VM packet communication in terms of memory access behaviors to study the hardware bottlenecks.

The benchmark that was used for the emulation is called mempipe-spin (Smith et al., Draft: Have you checked your IPC performance lately?, UNENIX 2012). Its data-path behavior mimics the inter-VM communication described above, minus the VM overheads, with shared ring memory for producer thread and consumer thread, and a ready flag that needs to be checked before read or write operation. The consumer uses a pull mode to check if the flag is ready, which is very similar to the pull model used in DPDK packet processing.

Figure 3:
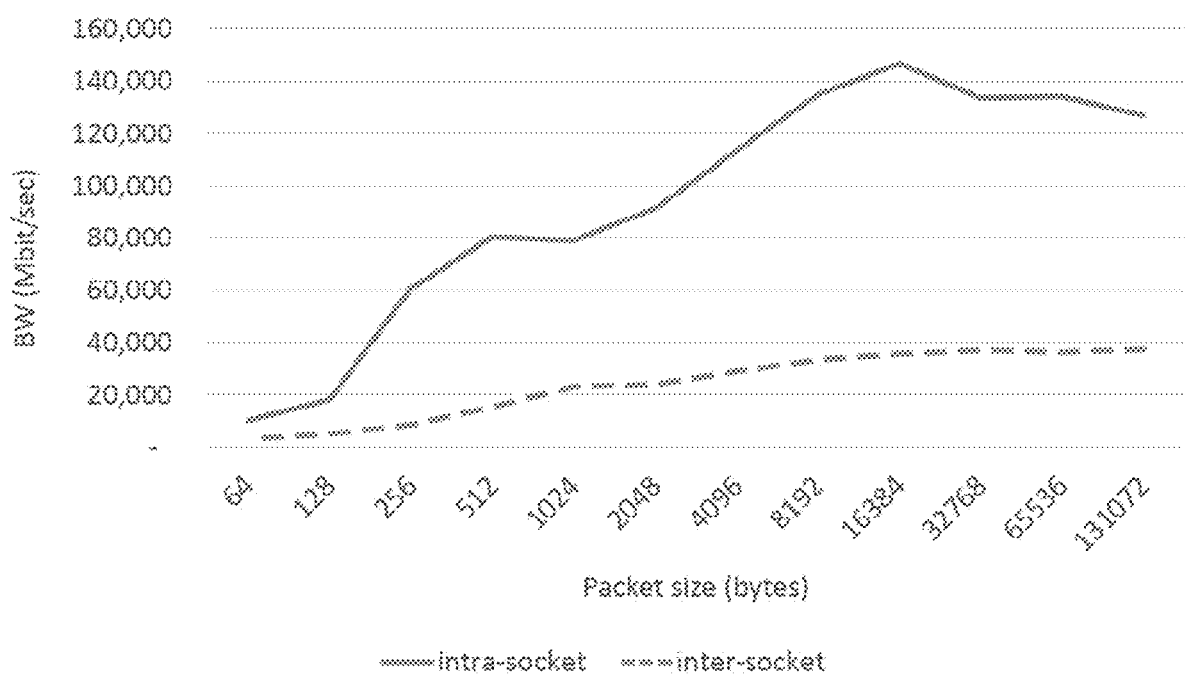
FIG. 3 is a graph comparing data transfer bandwidths for intra-socket and inter-socket communications.

FIG. 3 shows the throughput performance of mempipe-spin, with 2 threads running on 2 cores within a socket, and also 2 threads running on different sockets. From FIG. 3, we have two main observations. First, the throughput for communications within the socket, especially with smaller packet size, is far from the physical bandwidth limitation. Second, when the producer and consumer are on different sockets, the throughput performance becomes much worse.

During a producer-consumer data transfer, a first thread running on the producer writes a chunk of data (also referred to as a data object), which is then read by one or more other threads (depending on the number of consumers and the software architecture). When the data exchange medium is shared memory, on an abstract level this involves the producer writing data into a location in shared memory (e.g., at an address at which the data object is stored), and the consumer thread(s) accessing that location in shared memory. Easy and straightforward; that is, until you consider that the shared memory location may be replicated across different locations in system memory and various caches.

To illustrate this, we'll start off with a simple example illustrating a software application comprising a producer accessing data so that the software application can modify the data prior to sending it to a consumer. This is shown in FIG. 4*a*, which shows further detail to the platform hardware and software architectures depicted in FIG. 1.

In virtualized environments employing many VMs, it is a preferred practice to allocate a physical or logical processor core to each VM. This enables multiple threads corresponding to a given guest operating system processes and applications running on the guest OS to be executed on the same core. It also significantly improves memory accesses via the use of L1 and L2 caches for the core, as will become more evident below. Accordingly, in some of the Figures herein, VMs are shown as running on respective cores, recognizing that there may be instances in which a single core may host multiple VMs. While it is possible for the processes for a single VM to run on multiple cores (e.g., for a personal computer running a single VM such as an Apple Macintosh computer running a VM hosting a Microsoft Windows OS), that is not a likely usage scenario in SDN and NFV deployments.

As illustrated, each of the cores $114_1$ and $114_2$ include a respective L1 cache $116_1$ and $116_2$, and a respective L2 cache $118_1$ and $118_2$, each including multiple cache lines depicted as rectangular blocks. LLC 108 includes a set of LLC cache lines 430, and system memory 113 likewise includes multiple cache lines, including a set of memory cache lines 426 corresponding to a portion of shared space 406.

Figure 4A:
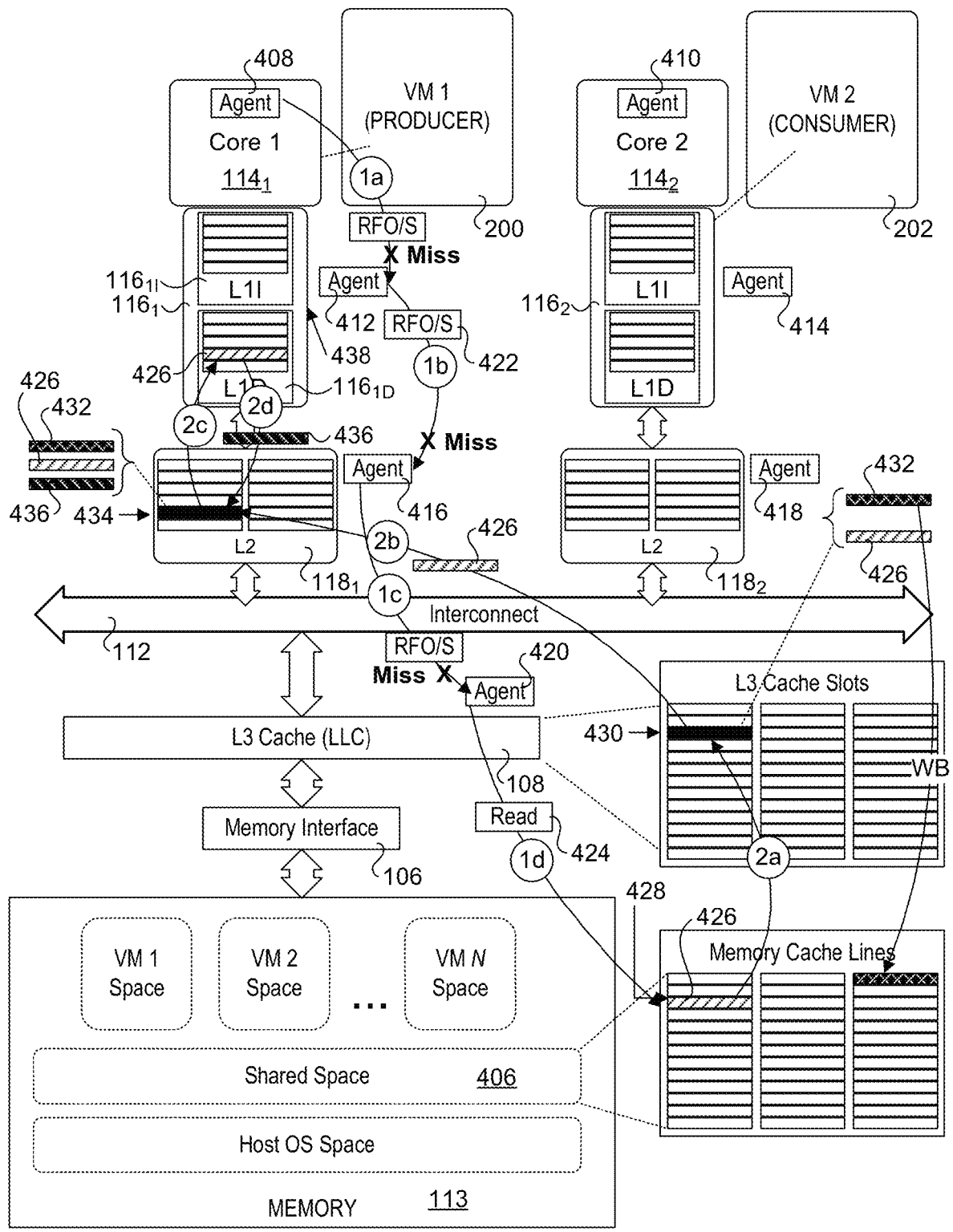
FIG. 4a is a schematic diagram illustrating access of a cache line by a producer application that is not currently stored in any cache level and is accessed from system memory, under a conventional approach.
Figure 4B:
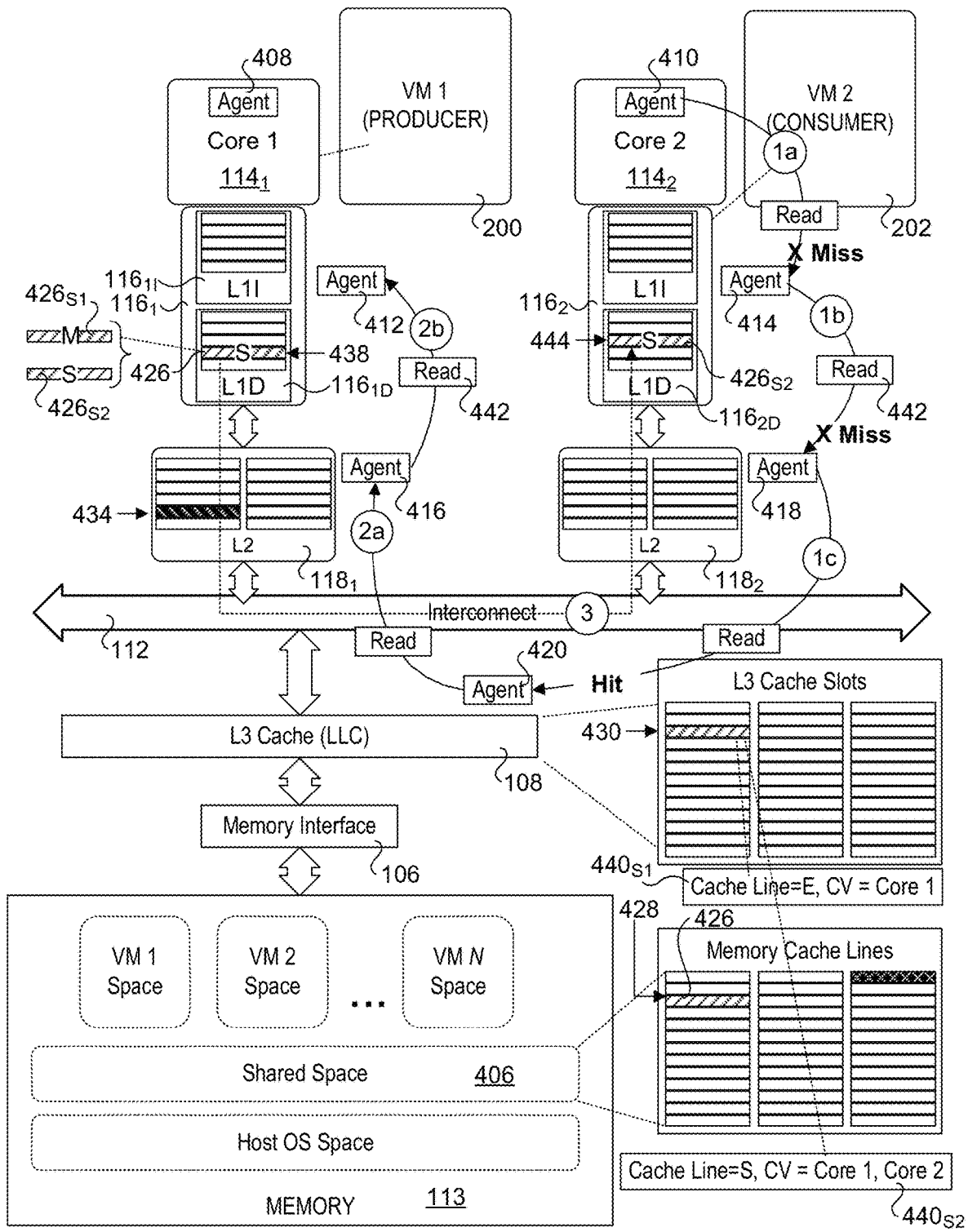
FIG. 4b is a schematic diagram illustrating a consumer application retrieving the cache line from the L1 cache of the core executing the producer application, under a conventional approach.
Figure 5:
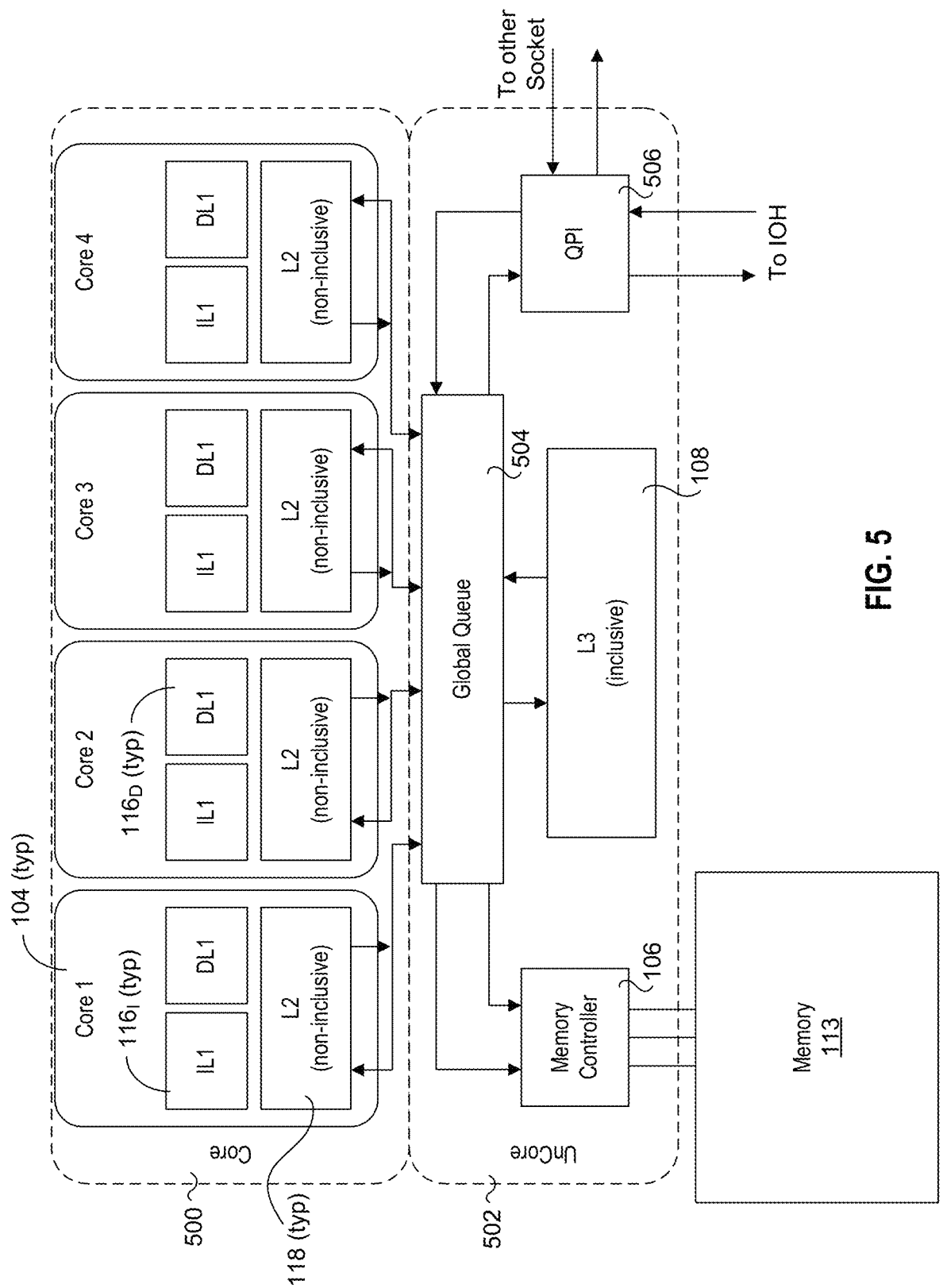
FIG. 5 is a schematic diagram illustrating an abstracted view of a memory coherency architecture employed by the platform shown in FIGS. 4a and 4b.

FIG. 5 shows an abstracted view of a memory coherency architecture employed by the embodiment of FIGS. 4a and 4b. Under this and similar architectures, such as employed by many Intel® processors, the L1 and L2 caches are part of a coherent memory domain under which memory coherency is managed by coherency mechanisms in the processor core 500. Each core 104 includes a L1 instruction (IL1) cache $116_1$, and L1 data cache (DL1) $116_D$, and an L2 cache 118. L2 caches 118 are depicted as non-inclusive, meaning they do not include copies of any cache lines in the L1 instruction and data caches for their respective cores. As an option, L2 may be inclusive of L1, or may be partially inclusive of L1. In addition, L3 may be non-inclusive of L2. As yet a first option, L1 and L2 may be replaced by a cache occupying a single level in cache hierarchy.

Meanwhile, the LLC is considered part of the "uncore" 502, wherein memory coherency is extended through coherency agents, resulting in additional overhead and processor cycles. As shown, uncore 502 includes memory controller 106 coupled to external memory 113 and a global queue 504. Global queue 504 also is coupled to an L3 cache 108, and a QuickPath Interconnect® (QPI) interface 506. Optionally, interface 506 may comprise a Keizer Technology Interface (KTI). L3 cache 108 (which functions as the LLC in this architecture) is inclusive, meaning that it includes is a copy of each cache line in the L1 and L2 caches.

As is well known, the size of the cache levels increase further away from the core, but so does the latency incurred in accessing cache lines in the caches. The L1 caches are the smallest (e.g., 32-64 KiloBytes (KB)), with L2 caches being somewhat larger (e.g., 256-640 KB), and LLCs being larger than the typical L2 cache by an order of magnitude or so (e.g., 8-16 MB). Of course, the size of these caches is dwarfed by the size of system memory (one the order of GigaBytes). Generally, the size of a cache line at a given level in a memory hierarchy is consistent across the memory hierarchy, and for simplicity and historical references, lines of memory in system memory are also referred to as cache lines even though they are not actually in a cache. It is further noted that the size of global queue 504 is quite small, as it is designed to only momentarily buffer cache lines that are being transferred between the various caches, memory controller 106, and QPI interface 506.

FIG. 4a further shows multiple cache agents that are used to exchange messages and transfer data in accordance with a cache coherency protocol. The agents include core agents 408 and 410, L1 cache agents 412 and 414, L2 cache agents 416 and 418, and an L3 cache agent 420.

FIG. 4a illustrates a simple memory access sequence in which a cache line is accessed from system memory and copied into L1 cache $116_1$ of core $114_1$. Data in system memory is stored in memory blocks (also referred to by convention as cache lines as discussed above), and each memory block has an associated address, such as a 64-bit address for today's 64-bit processors. From the perspective of applications, which includes the producers and consumers, a given chunk of data (data object) is located at a location in system memory beginning with a certain memory address, and the data is accessed through the application's host OS. Generally, the memory address is actually a virtual memory address, and through some software and hardware mechanisms, such virtual addresses are mapped to physical addresses behind the scenes. Additionally, the application is agnostic to whether all or a portion of the chunk of data is in a cache. On an abstract level, the application will ask the operating system to fetch the data (typically via address pointers), and the OS and hardware will return the requested data to the application. Thus, the access sequence will get translated by the OS as a request for one or more blocks of memory beginning at some memory address which ends up getting translated (as necessary) to a physical address for one or more requested cache lines.

Returning to FIG. 4a, the access sequence would begin with core $114_1$ sending out a Read for Ownership (RFO) message and first "snooping" (i.e., checking) its local L1 and L2 caches to see if the requested cache line is currently present in either of those caches. In this example, producer 200 desires to access the cache line so its data can be modified, and thus the RFO is used rather than a Read request. The presence of a requested cache line in a cache is referred to as a "hit," while the absence is referred to as a "miss." This is done using well-known snooping techniques, and the determination of a hit or miss for information maintained by each cache identifying the addresses of the cache lines that are currently present in that cache. As discussed above, the L2 cache is non-inclusive, making the L1 and L2 caches exclusive, meaning the same cache line will not be present in both of the L1 and L2 caches for a given core. Under an operation 1a, core agent 408 sends an RFO message with snoop (RFO/S) 422 to L1 cache agent 412, which results in a miss. During an operations 1b, L1 cache agent 412 the forwards RFO/snoop message 422 to L2 cache agent 416, resulting in another miss.

In addition to snooping a core's local L1 and L2 caches, the core will also snoop L3 cache 108. If the processor employs an architecture under which the L3 cache is inclusive, meaning that a cache line that exists in L1 or L2 for any core also exists in the L3, the core knows the only valid copy of the cache line is in system memory if the L3 snoop results in a miss. If the L3 cache is not inclusive, additional snoops of the L1 and L2 caches for the other cores may be performed. In the example of FIG. 4a, L2 agent 416 forwards RFO/snoop message 422 to L3 cache agent 420, which also results in a miss. Since L3 is inclusive, it does not forward RFO/snoop message 422 to cache agents for other cores.

In response to detecting that the requested cache line is not present in L3 cache 108, L3 cache agent 420 sends a Read request 424 to memory interface 106 to retrieve the cache line from system memory 113, as depicted by an access operation 1d that accesses a cache line 426, which is stored at a memory address 428. As depicted by a copy operation 2a, the Read request results in cache line 426 being copied into a cache line slot 430 in L3 cache 108. Presuming that L3 is full, this results in eviction of a cache line 432 that currently occupies slot 430. Generally, the selection of the cache line to evict (and thus determination of which slot in the cache data will be evicted from and written to) will be based on one or more cache eviction algorithms that are well-known in the art. If cache line 432 is in a modified state, cache line 432 will be written back to memory 113 (known as a cache write-back) prior to eviction, as shown. As further shown, there was a copy of cache line 432 in a slot 434 in L2 cache $118_1$, which frees this slot. Cache line 426 is also copied to slot 434 during an operation 2b.

Next, cache line 426 is to be written to L1 data cache $116_{1D}$. However, this cache is full, requiring an eviction of one of its cache lines, as depicted by an eviction of a cache line 436 occupying a slot 438. This evicted cache line is then written to slot 434, effectively swapping cache lines 426 and 436, as depicted by operations 2c and 2d. At this point, cache line 426 may be accessed (aka consumed) by core $114_1$.

Oftentimes, as described above with reference to FIG. 2, a first NFV appliance (the producer) will generate data corresponding to a first object (e.g., modify the first object), and subsequently a second NFV appliance (the consumer) will want to access the object. In one case, multiple NFV appliances may want to simply read that same object's data. An illustration of an example of how this is done under a conventional approach is shown in FIG. 4b.

At the start of the process, there are three copies of cache line 426—one in memory 113, one in slot 430 of L3 cache 108 and the other in slot 438 of L1 data cache $116_{1D}$. Cache line 430 holds data corresponding to a data object. (For simplicity, only a single cache line is shown; in practice, the data for a data object will generally span multiple cache lines.) The consumer, executing on Core 2, desires to access the data object, which it knows is located at memory address 428 (per corresponding software object code executing on Core 2).

As further depicted in FIG. 4b, L3 cache agent 420 maintains information of each cache line it stores relating to the state of the cache line and which cores have copies of the cache line. In one embodiment, core valid (CV) bits are used to indicate which core(s) have a valid copy of the cache line. When cache line 426 is copied to L3 cache 108, its cache line status data is set to indicate that cache line 426 is in the (E)xclusive state, and the CV bits indicate Core 1 has the only valid copy of the cache line, as depicted by cache line status data $440_{S1}$. Subsequently, producer 200 modifies the data object, resulting in the state of cache line 426 being updated to (M)odified state $426_{S1}$. In accordance with conventional cache coherency schemes and cache eviction policies, the modified copy of the cache line is not written to L3 cache 108 at this point.

Core 2 agent 410, will send out a Read request 442 along with a cache snoop to determine whether cache line 426 is present in either its L1 data cache $116_{2D}$ or its L2 cache $118_2$, or L3 cache 108. As depicted by operations 1a and 1b, core agent 410 sends a first cache snoop to L1 cache agent 414 requesting access to cache line 426 (e.g., Read request 422), resulting in a miss, and the snoop is forwarded to L2 cache agent 418, resulting in a second miss. As before, the Read request message with snoop is forwarded from the L2 cache agent (418) to L3 cache agent 420.

L3 cache agent 420 checks to see if a copy of cache line 426 is present in L3 cache 108, resulting in a hit. L3 cache agent 420 the checks cache line status data $440_{S1}$ and determines the Core 1 has exclusive ownership of cache line 426. Since a cache line in an exclusive state can be modified by its owner, it is possible that cache line 426 has been modified (in this case it has), and thus the copy of cache line 426 held by L3 cache 108 is not current. Accordingly, L3 cache agent 420 sends the read request to the L1 and L2 cache agents for Core 1, as depicted by operations 2a and 2b eventually being serviced by L1 cache agent 412.

In response to receiving Read request 442, a copy of modified cache line 426 will be forwarded from L1 data cache $116_{1D}$ to L1 data cache $116_{2D}$ via interconnect 112 and written to a slot 444, as depicted by an operation 3. In addition, each copy of cache line 426 in L1 data cache $116_{1D}$ and L1 data cache $116_{2D}$ will be marked as (S)hared, as depicted by cache line states $426_{S2}$. For simplicity, existing cache lines in one or more of L1 data cache $116_{2D}$ and L2 cache $118_2$ that might be evicted as a result of copying cache line 426 are not shown, but similar results to those illustrated in FIG. 4a and discussed above may be expected if L1 data cache $116_{2D}$ and L2 cache $118_2$ are full.

In connection with operation 3, the copy of cache line 426 in L3 cache 108 is also updated to reflect the modified data in cache line 426. Additionally, the cache line 426 status data is updated to reflect that cache line 426 is now shared by both Core 1 and Core 2, as depicted by cache line status data $440_{S2}$.

Each snoop has an associated cycle cost accruing latency, and consumes bandwidth on the processor's interconnects. Moreover, while a processor core is waiting for access to its requested data, processing of the thread requesting the access is stalled.

Figure 6:
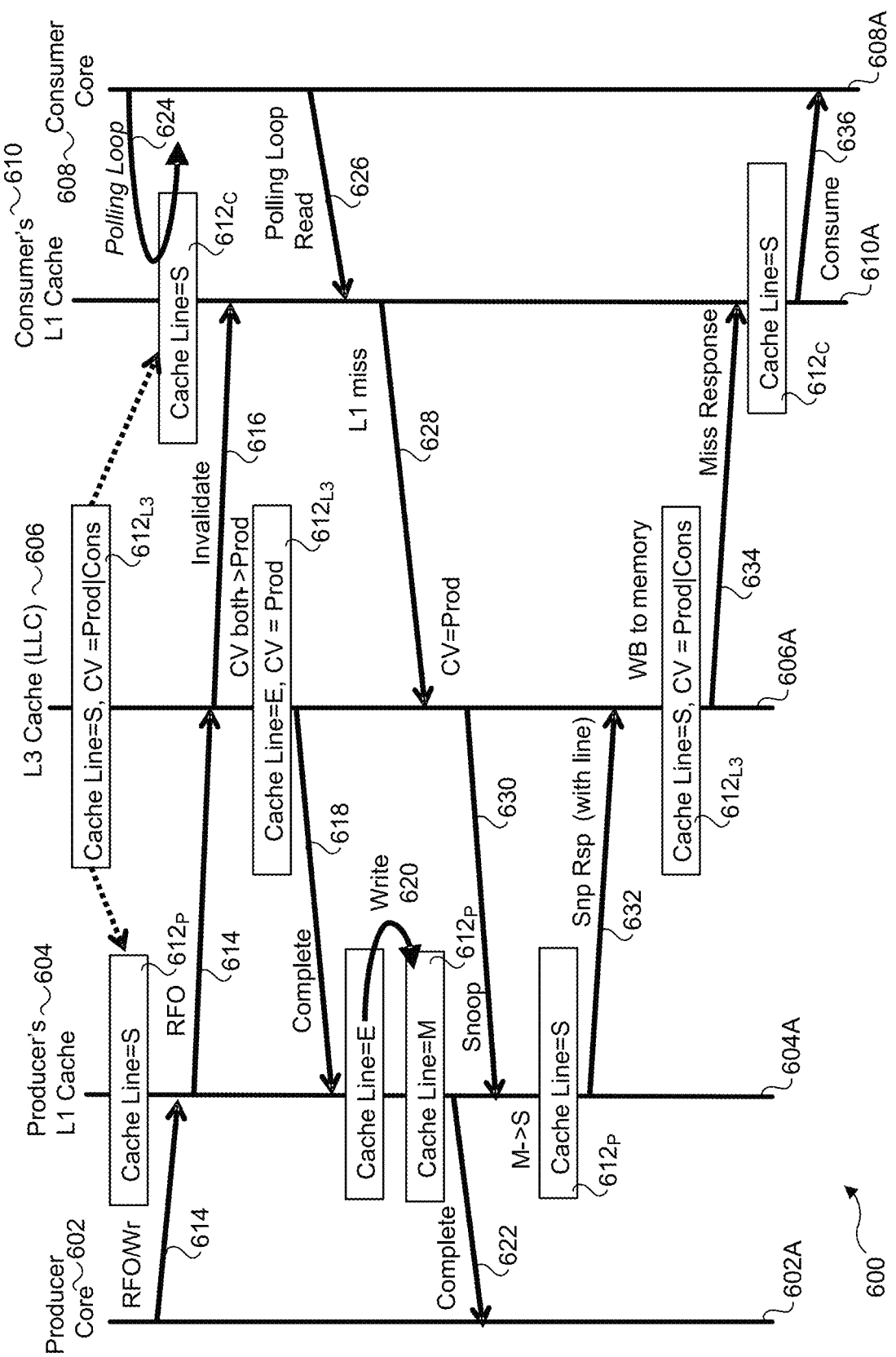
FIG. 6 is a message flow diagram illustrating a producer core assessing a cache line held in an L3 cache and modifying it, and a consumer core accessing the same cache line after the cache line has been modified, under a conventional approach.

A more complex memory access sequence is illustrated in FIG. 6, which shows a message flow diagram 600 implemented on a computer platform comprising a producer core 602 including a producer's L1 cache 604, an L3 cache (e.g., LLC) 606, and a consumer core 608 having a consumer's L1 cache 610. Each of these components has a respective agent, as depicted by agents 602A, 604A, 606A, 608A, and 610A. In FIG. 6, L2 caches are not shown since in this example the copies of the cache line are in the L1 caches.

At an initial state, there are three copies of a cache line 612 that are currently cached in producer's L1 cache 604, L3 cache 606, and consumer's L1 cache 610, respectively depicted as cache lines $612_P$, $612_{L3}$, and $612_C$. Each of cache lines $612_P$ and $612_C$ are marked as (S)hared, while cache line $612_{L3}$ includes cache line status data identifying cache line 612 is shared and each of the producer core and the consumer core hold a valid copy of the cache line.

As shown, producer core 602 desires to gain ownership of a shared cache line 602 so it can modify it. For example, if produce core 602 desires to modify its copy (cache line $612_P$) of cache line 612 by writing to it, it must first obtain ownership of the cache line. To obtain ownership of cache line 612, the producer core's agent 602A sends a Read For Ownership (RFO) (Wr)ite request 614 to agent 604A for producer's L1 cache 604. RFO 614 is forwarded by agent 604A to agent 606A for L3 cache 606. In response to receiving RFO 614, agent 606A and sends an invalidate message 616 to the consumer's L1 cache agent 610A, and updates its cache line $612_{L3}$ status data to indicate the cache line is now in the (E)xclusive state, identifying the producer core 602 as the exclusive owner of cache line 612. Upon receipt of invalidate message 616, agent 610A will mark cache line $612_C$ as (I)nvalid (not shown).

Agent 606A for L3 cache 606 returns a complete message 618 to agent 604A for producer's L1 cache 604. Upon receipt, cache line $612_P$ is marked as (E)xclusive. Data is then written to cache line $612_P$ (as depicted by a Write 620), and cache line $612_P$ is marked as (M)odified. Agent 604A then returns a complete message 622 to producer core 602's agent 602A, completing the Write transaction.

Asynchronously, agent 608A for consumer core 608 periodically polls the status of cache lines in consumer's L1 cache 610, as depicted by a polling loop 624. Subsequently, agent 608A attempts to read its copy of cache line 612 (cache line $612_C$) using a polling loop read 626. Since at this point cache line $612_C$ is marked (I)nvalid, this results in an L1 cache miss, and agent 610A for consumer's L1 cache 610 sends a message 628 to agent 606A identifying producer core 602 as holding the valid cache line, as identified by a corresponding CV bit. Agent 606A then sends a snoop 630 with the read request to agent 604A. In response, the state of cache line $612_P$ is changed from (M)odified to (Shared), and a snoop response 632 including a copy of cache line $612_P$ is returned to agent 606A.

Upon receiving snoop response 632, agent 606A performs a memory write-back (WB) of the cache line, and returns the status of its copy ($612_{L3}$) to (S)hared, and appropriate CV bits are set to once again identify that producer core 602 and consumer core 608 hold valid copies of the cache line. Subsequently, a cache line miss response 634 including the modified copy of cache line 612 is received by agent 610A, which is used to overwrite the data in cache line $612_C$, and mark cache line $612_C$ as (S)hared. Once in the consumer's L1 cache, the consumer core 608 consumes the cache line, as depicted by a consume operation 636.

When the foregoing cache line access sequence was tested as a producer/consumer baseline transaction on one class of processor, it took 112 processor cycles just to complete the read request. That is a significant amount of overhead, with a large amount of traffic being sent between the various agents to facilitate the transaction while maintaining cache coherency. These operations cause longer latency for each memory access of producer-consumer workload, as in inter-VM communication. As a result, testing has shown the processor is stalled for more than 50% of its cycles (i.e., >50% of CPU cycles are spent without retiring instructions).

Ideally the producer could use a pushing-store instruction to push the data into consumer's MLC to save latency. However, this approach requires the software to always know the target MLC, which can potentially be impractical, especially with frequent VM migration. Also the pushing operation may evict useful data in the consumer MLC due to the MLC's limited capacity.

To achieve significant performance gain without significant additional complexity, a Cache Line Demotion (CLDEMOTE) instruction is used in one embodiment. The CLDEMOTE instruction immediately allocates the cache line into the LLC from the producer's MLC, so that the consumer can access the data directly from the LLC to reduce the memory reference latency. Note that a CLDEMOTE instruction simply causes a cache line of a lower level cache to be moved into a higher level cache. As such, discussion with respect to movement from L1 to LLC is applicable to other movement such as L1 to L2, L2 to L3, MLC to LLC, etc. The CLDEMOTE instruction allows the software to provide application level knowledge to hardware for optimizations. By proactively pushing data to the LLC that is closer to the consumer, the communication latency is reduced by more than 2×, thus improving performance, and reducing the number of coherence messages (avoid consulting SF) to save energy.

Figure 7:
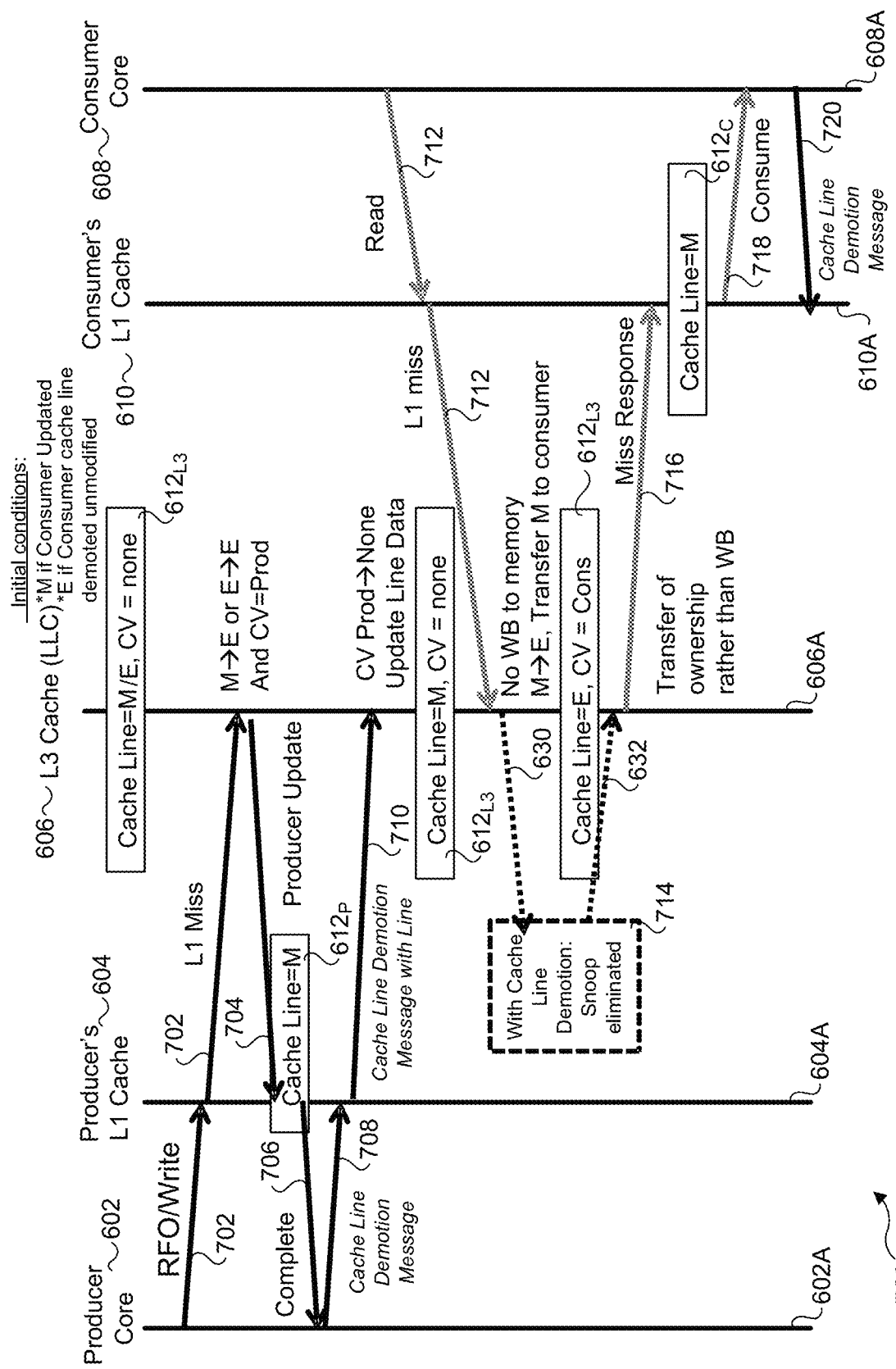
FIG. 7 is a message flow diagram illustrating a similar cache line access by the producer core and consumer core under which cache line demotion is used, according to one embodiment.

FIG. 7 shows a message flow diagram 700 corresponding to a similar pair of Write and Read transactions originating from producer core 602, and consumer core 608, respectively, that were performed in message flow diagram 600 of FIG. 6. Messages are passed between the same agents in both message flow diagrams. As a starting condition, there is a copy of cache line 612 in L3 cache 606, as depicted by cache line $612_{L3}$. The initial state of cache line $612_{L3}$ is either (M)odified, if the consumer's copy of cache line 612 has been updated, or (E)xclusive if the consumer's copy had been cache line demoted unmodified. The CV is none, indicating there is no copy of cache line present in either producer's L1 (or L2) cache 604 or consumer's L1 (or L2) cache 610.

As before, agent 602A for producer core 602 sends a RFO/Write message 702 to agent 604A, which results in an L1 miss. In response, agent 604A forwards RFO/Write message 702 to agent 606A for L3 cache 606, which has a copy of the requested cache line (cache line $612_{L3}$). Depending on the initial state, the state for cache line $612_{L3}$ is either transitioned from (M)odified to (E)xclusive, or remains (E)xclusive. The CV bits are updated to identify producer core 602 has the only valid copy of the cache line. A copy of cache line $612_{L3}$ is returned by agent 606A to agent 604A via a message 704, as depicted by cache line $612_P$. This copy is then updated by the producer's Write, and marked as (M)odified, followed by a complete message 706 returned to agent 602A.

Under the conventional approach, cache line $612_P$ would remain in producer's L1 cache 604 until it was evicted. However, under this new approach, the application that has modified the cache line includes a CLDEMOTE instruction to demote cache line $612_P$. Accordingly, in conjunction with execution of the CLDEMOTE instruction, a cache line demotion message 708 is sent by agent 602A to agent 604A to demote cache line $612_P$ to L3 cache 606. In response to receiving the cache line demotion message 708, agent 604A evicts cache line $612_P$ and forwards the cache line to agent 606A, which overwrites (updates) the existing data in cache line $612_{L3}$, and marks the cache line as (M)odified. The CV bit for the producer core is reset to reflect there are no cores holding a valid copy of the cache line.

In a similar manner to above, agent 608A of consumer core 608 sends a Read request 712 to agent 610A identifying cache line 612. The lookup of cache line 612 results in a miss (for both of the consumers L1 and L2 caches), and agent 610A forwards Read request 712 to agent 606A. Since the modified version of cache line $612_P$ was demoted using the CLDEMOTE instruction, the modified copy of the requested cache line 612 is already in cache line $612_L3$. As a result, snoop message 630 and snoop response 632 are eliminated, as depicted by block 714.

In response to Read request 712, agent 606A returns a copy of the modified cache line $612_L3$ in a miss response message 716 to agent 610A. This copy of the modified cache line is then written to a cache line slot in consumer's L1 cache 610, as depicted by a cache line $612_C$ with a status marked as (M)odified. Cache line $612_C$ is then retrieved from consumer's L1 cache 610 to be consumed by consumer core 608, as depicted by a consume operation 718. If the application running on consumer core 608 knows it will only be reading a cache line, it can proactively demote it with the CLDEMOTE instruction, as depicted by a cache line demotion message 720.

Returning to cache line $612_{L3}$, in the embodiment illustrated in FIG. 7, there is no write-back to memory, even though the data in cache line $612_{L3}$ has been modified. The state of cache line $612_{L3}$ is marked as (E)xclusive, with CV set to the consumer, transferring ownership of the cache line to consumer's L1 cache 610 rather than performing a write-back to memory.

Using proactive cache line demotion with the CLDEMOTE instruction, latencies associated with memory transaction can be significantly reduced. For example, under message flow diagram 700, the number of processor cycles for the consumer Read memory access is reduced to 48 cycles. However, while the CLDEMOTE instruction provides significant benefit for a data structure with one frequently touched cache line, for data structures in which multiple cache lines are accessed, modified, and then demoted, the associated programming and execution overheads are significantly increased. Such data structures are especially common in usage models such as networking workloads, which often use vector operations, such as scatter and gather, to compute hashes, route packets, etc.

To reduce these overheads, embodiments of the invention include Vectorized Cache Line Demotion (VCLDEMOTE), to bridge the gap between vector operations and producer/consumer or packet processing workload. The VCLDEMOTE instruction provides the ability for a producer core to demote multiple cache lines at once from one cache level within a cache hierarchy to another level of the same cache hierarchy. In one embodiment, multiple demoted cache lines are moved from the MLC to the shared LLC or from L1/L2 cache to a shared L3 cache. In other embodiments, multiple cache lines may be moved from L1 cache to shared L2 cache, or from any one of L1/L2/L3 cache to a shared L4 cache. It is worth noting that cache line demotion occurs within a cache hierarchy and does not move cache lines to the system memory.

In one embodiment, the VCLDEMOTE instruction utilizes the single instruction, multiple data (SIMD) computer paradigm to perform cache line demotion on multiple data elements simultaneously. According to the embodiment, VCLDEMOTE instruction streamlines the work that a compiler or developer may need to do in relating vector data operations to data movement optimizations, by targeting code that is already vectorized for gather-scatter usage. Gather and scatter instructions are well-known in the art and thus details regarding their operation is omitted in this application. In high performance computing and technical/scientific processing codes with irregular data accesses, gather and scatter instructions simplify vectorization by the compiler. Thus, in introducing the VCLDEMOTE instruction, the compiler or developer would need to do very little extra work to ensure that cache line demotion hints are passed along with the same operand and mask configurations that are used to perform gather and scatter.

The VCLDEMOTE instruction also reduces the number of instructions and amount of book-keeping in hot code loops by performing iterative and accumulative demotion operation. According to an embodiment, the programmers or compilers can accumulate cache line within the body of a loop that would otherwise be individually demoted by the CLDEMOTE instruction and then issue a VCLDEMOTE instruction at the loop boundary to demote all accumulated cache line at once. In cases where loops have very few demotion targets, the VCLDEMOTE instruction enables the programmers and compilers to combine demotion targets across loops without complex book-keeping or resource required to track registers and caches.

In one embodiment, the VCLDEMOTE instruction is optimized with compacted range addresses in memory (CRAM). CRAM uses base-relative addressing or in-range addressing to augment the capacity of a vector register by increasing the number of addresses (i.e., data elements) that can be stored. For instance, in a 64-bit computer processor, a 512-bit vector register typically stores eight 64-bit memory addresses. However, with CRAM, instead of storing each full 64-bit memory address, the vector register stores only a 32-bit long offset from a base address to the memory address. To determine a full 64-bit memory address, the 32-bit offset is added to the 64-bit base address. Since the offset is shorter than the full memory address and takes up less storage space, the number of cache line addresses that can be stored in a 512-bit vector register increases significantly, resulting in a much denser packing of memory addresses. While 32-bit offsets are described here for a 512-bit vector register, any suitable size combination between the vector register and address offset may be used. For instance, the vector register may be 64, 128, 256, or 512 bits long and the address offsets may be 8, 16, 32, or 64-bits in length.

According to an embodiment, VCLDEMOTE gives processor or other hardware an extra degree of movement in adapting caching hints to runtime conditions. Hardware may interpret a hint differently at different times. Since VCLDEMOTE supplies many cache lines to be operated on at the same time, it gives the processor and hardware one more dimension of flexibility in how stringently to apply the demotion hint. For example, with respect to the cache lines supplied by a VCLDEMOTE instruction, hardware may decide to demote no cache line, all cache lines, or somewhere in-between. Additionally, the hardware may further decide to demote, for example, 8 cache lines from L1 cache to L3 cache in one situation but evict 16 cache lines from L1 cache to L2 cache in another situation when the L2 cache to L3 cache bandwidth is oversubscribed.

The use of VCLDEMOTE instruction also reduces or eliminates redundant cache line demotions. With CLDEMOTE, software typically has to explicitly avoid duplicating cache line demotions by checking whether different addresses fall in the same cache line. However, with the VCLDEMOTE instruction, this explicit check can be passed onto the hardware which, as described below, collapse duplicate cache lines internally. In x86 systems where the store bandwidth from the core is a limited and highly contested resource, eliminating redundant demotion is highly desirable.

Furthermore, VCLDEMOTE allows software to combine demotion hints with anti-demotion hints and thus prevent unwise movement of data by letting an algorithm "see around the iteration corners" as well as fine tune hints to achieve complex control or data flow. According to an embodiment, operand masking can add new value with VCLDEMOTE. For example, suppose that there are two addresses, X and Y, that happen to fall in the same cache line C. However, the software code is not aware of this. As such, if the software wants to demote X but not Y, it has no way of communicating to the hardware to "demote X, but do not demote Y." In contrast, this can be easily accomplished by the mask bits utilized by one embodiment of the VCLDEMOTE instruction. According to this embodiment, the processor or hardware receives from the VCLDEMOTE instruction both addresses X and Y in one vector register. By examining the addresses in the vector register, the processor or hardware can easily determine that X and Y are in the same cache line C but have different value for their respective mask bit(s). For instance, the mask bit for X may be FALSE (e.g., 0) while the mask for Y is TRUE (e.g., 1). Based on the masks, the hardware can then determine that the software or application which issued the VCLDEMOTE instruction intended to demote X but not demote Y. Since addresses X and Y are in the same cache line C and demoting cache line C means demoting both X and Y, the processor or hardware will then know not to demote cache line C.

Since both VCLDEMOTE and CLDEMOTE instructions are hints, their effects in microarchitecture can vary considerably. For example, according to an embodiment, it is conceivable that the cache line demotions requested by a VCLDEMOTE instruction may be predicated on a control that takes into account core counts, processor utilizations, utilization of pathways between core and uncore caches, and hysterisis, among many possible considerations.

Figure 8:
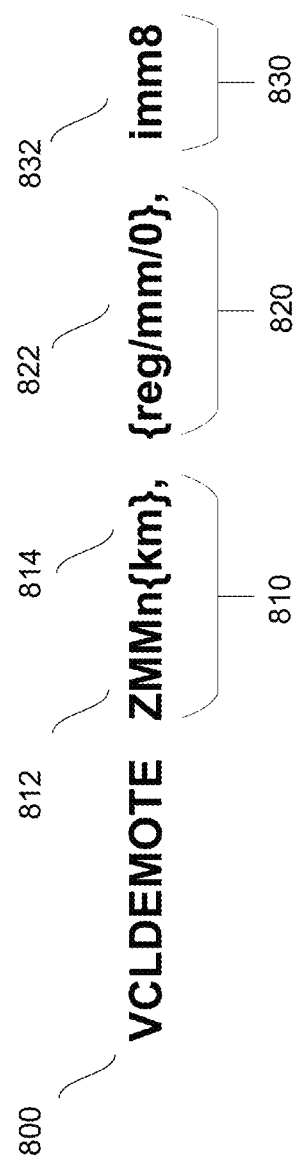
FIG. 8 is an exemplary embodiment of a VCLDEMOTE machine instruction.

FIG. 8 illustrates an embodiment of a VCLDEMOTE machine instruction 800 that takes three operands: 810, 820, and 830. The first operand 810, also referred to as the vector register operand, comprises an address or a pointer to a vector register ZMMn 812 that stores multiple (i.e. vectorized) data elements to be operated on. In one embodiment, the data elements in vector register ZMMn 812 are memory addresses to one or more cache lines to be demoted (i.e., absolute addressing scheme). In another embodiment, the data elements are address offsets used for determining the cache lines to be demoted (i.e., base-relative addressing scheme). In addition to the vector register, the first operand, according to an embodiment, may also comprise or specify a mask register km 814 containing mask bits where each mask bit corresponds to one of the data elements in the vector register. Alternatively, the mask bits may be stored within the vector register ZMMn 812.

The second operand or the base address operand 820 of the VCLDEMOTE instruction comprises a base address or a pointer to a register or memory location containing a base address. According to an embodiment, the second operand is optional and the inclusion of the second operand in a VCLDEMOTE instruction may be used as an indication that the data elements in the vector register ZMMn 812 are base-relative addresses. Conversely, if a VCLDEMOTE instruction does not include a second operand, the vector register ZMMn 812 is presumed to contain the absolute address to one or more cache lines. In this case, the base address taken as zero.

The third operand 830, which is also optional, stores an immediate. According to an embodiment, the immediate is an 8-bit value used to indicate whether the addresses stored in the vector register ZMMn 812 are absolute addresses or offsets to a base address. In at least one embodiment, the absence of a third operand 830 serves as an indication that the addresses in the vector register ZMMn 812 are absolute addresses. In such case, a default displacement value is used for determining the absolute addresses from the vector register ZMMn 812. On the other hand, if the third operand 830 is present, the third operand 830 may specify, or be used to determine, a specific displacement value. The displacement value, whether default or specific, defines the length of the data elements stored in the vector register ZMMn 8. Specifically, the displacement value is used to separate the bits stored in the vector register ZMMn 812 into individual data elements such as individual addresses or offsets.

Figure 9:
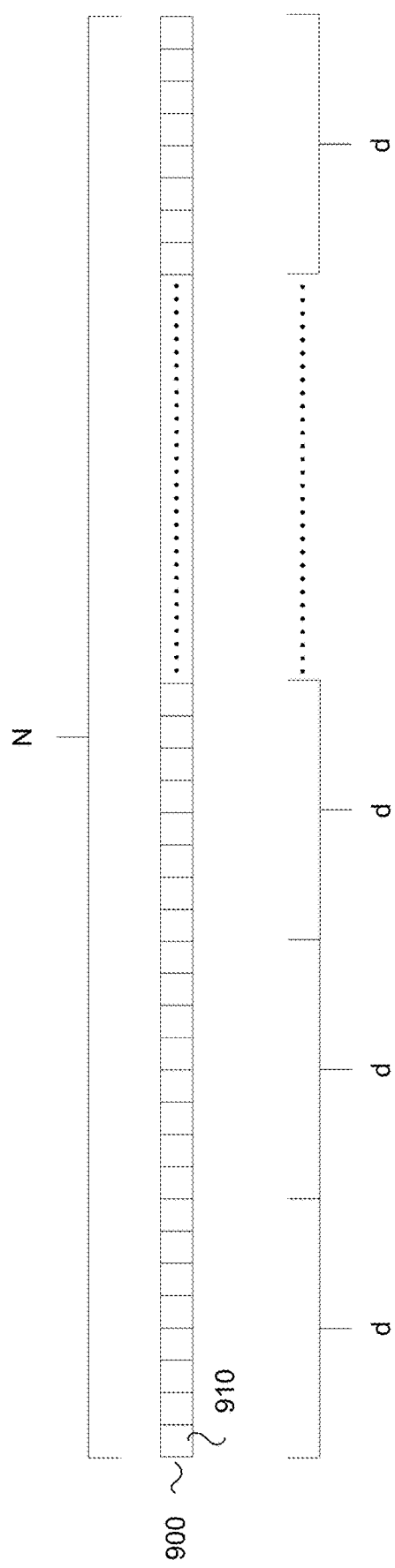
FIG. 9 illustrates the use of displacement value to determine data elements in a vector register according to an embodiment.

FIG. 9 illustrates the use of displacement value to determine data elements in a vector register according to an embodiment. The vector register 900 contains N individual bits 910. The displacement value d defines the size or length of each data element stored in the vector register 900. The number of data elements in the vector register 900 is thus N/d, where each data element is d bits long. For example, if the vector register is 512-bit long and the default displacement value is 64, the bits in the vector register would be split into eight 64-bit long addresses. If the displacement value specified by the third operand is 32, then the bits in the 512-bit vector register is separated into sixteen 32-bit long base-relative offsets.

Figure 10:
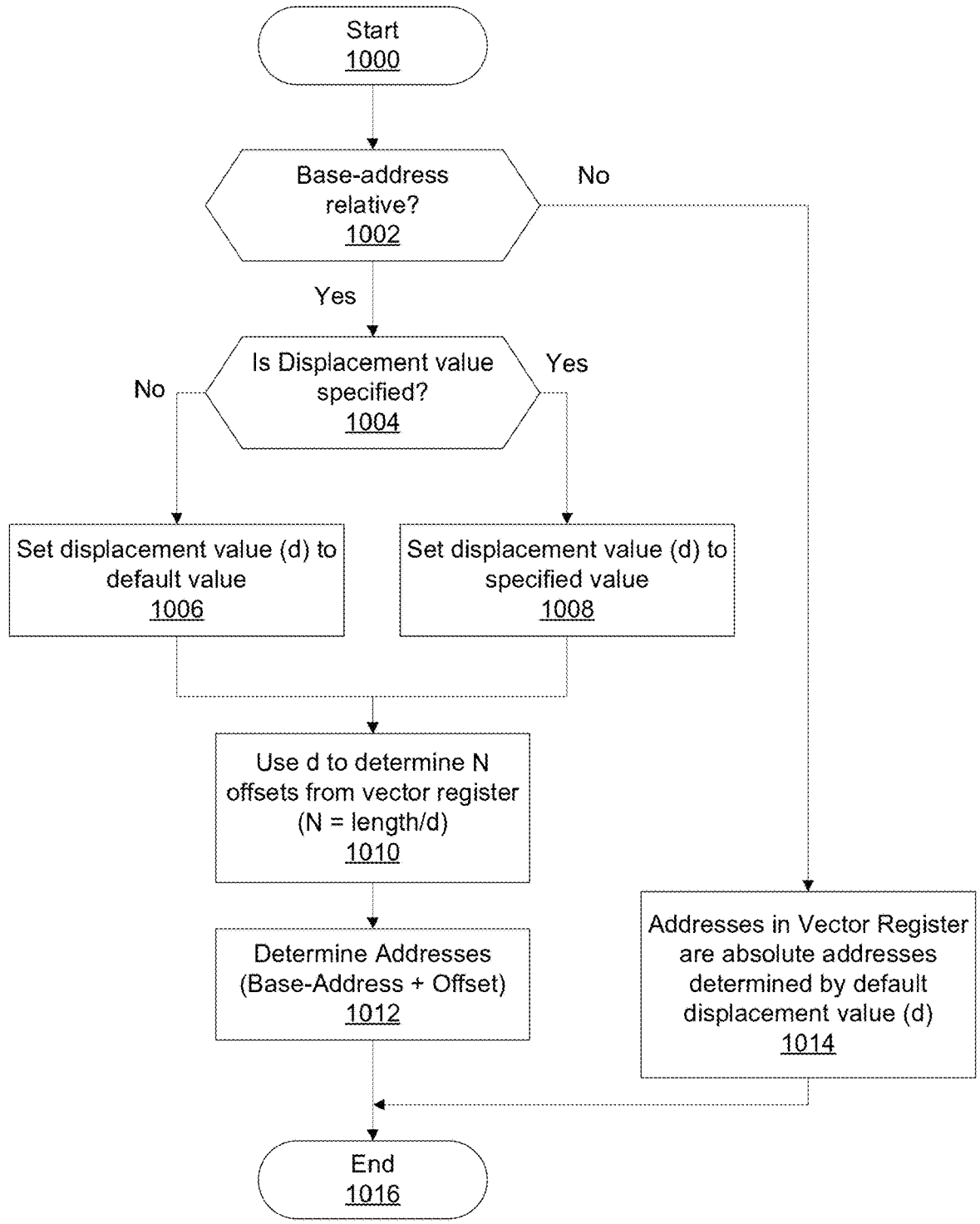
FIG. 10 is a flow diagram illustrating one embodiment of a method for determining memory addresses from the data bits stored in a vector register.

FIG. 10 illustrates an embodiment of a method for determining memory addresses from the data bits stored in the vector register (e.g., ZMMn 1012). The method, which can be implemented by software, hardware, or a combination of both, begins at block 1000. At block 1002, a determination is made on whether the addressing scheme used by the instruction (e.g., VCLDEMOTE) with respect to the data bits stored in the vector register is base-relative to a base address. According to an embodiment, the addressing schemed used is specified by or determined from the operand of the instruction. For instance, in one embodiment of a VCLDEMOTE instruction, if the third operand (e.g., 832 from FIG. 8) contains a value greater than zero, then base-relative addressing scheme is used. On the other hand, if the third operand is of the value zero, then absolute addressing scheme is used. Moreover, in some embodiments, the mere presence or absence of an optional operand in an instruction is enough for determining the addressing scheme. For instance, in an embodiment of the VCLDEMOTE instruction, the presence of an optional second operand indicates that a base-relative addressing scheme is used while the absence of the second operand signals the opposite. Referring back to FIG. 10, if the determination at block 1002 indicates that the addressing scheme used is not base-relative, the data bits in the vector register represent absolute memory addresses. As such, a default displacement value (e.g., 64) is used for determining the memory address at block 1014. For example, in a 512-bit vector register, if the default displacement value is 64, bit 0 to bit 63 would make up the first memory address, bit 64-127 would make up the second memory address, etc. After determining the memory addresses, the method ends at block 1016.

On the other hand, if the determination at 1002 indicates that the addressing scheme used is base-relative, the method next determines whether a displacement value is specified by the instruction in block 1004. If no displacement value is specified by the instruction (e.g., a VCLDEMOTE instruction with a null or zero third operand), the displacement value is set to the default value at block 1006. A default displacement value may be 64 in a 64-bit processor or operating system. Otherwise, if the instruction does specify a value, the displacement value is set to the specified value at block 1008. According to an embodiment, the third operand 1020 from FIG. 10 specifies the displacement value, which may be 8, 16, 32, 64, etc. At block 1010, the displacement value, whether default or specified, is applied to the data bits stored in vector register to separate each offset stored in the vector register. The application of displacement value to data bits in the vector register is the same as what was described above. For example, according to an embodiment, for a 512-bit vector register with specified displacement value of 32, bits 0-31 makes up the first address offset, bits 32-63 makes up the second address offset, etc. Each address offset is then added to a base address to obtain the full memory address to be operated on by the instruction. The base address is specified by the second operand of a VCLDEMOTE instruction, according to an embodiment. At block 1016, the method terminates as the memory addresses have been determined. While the base-relative addressing scheme utilizing the compacted range addresses in memory (CRAM) optimization is described here in terms of a VCLDEMOTE instruction, such addressing scheme may be implemented in a variety of other vector instruction that operate on vectorized data elements.

Figure 11:
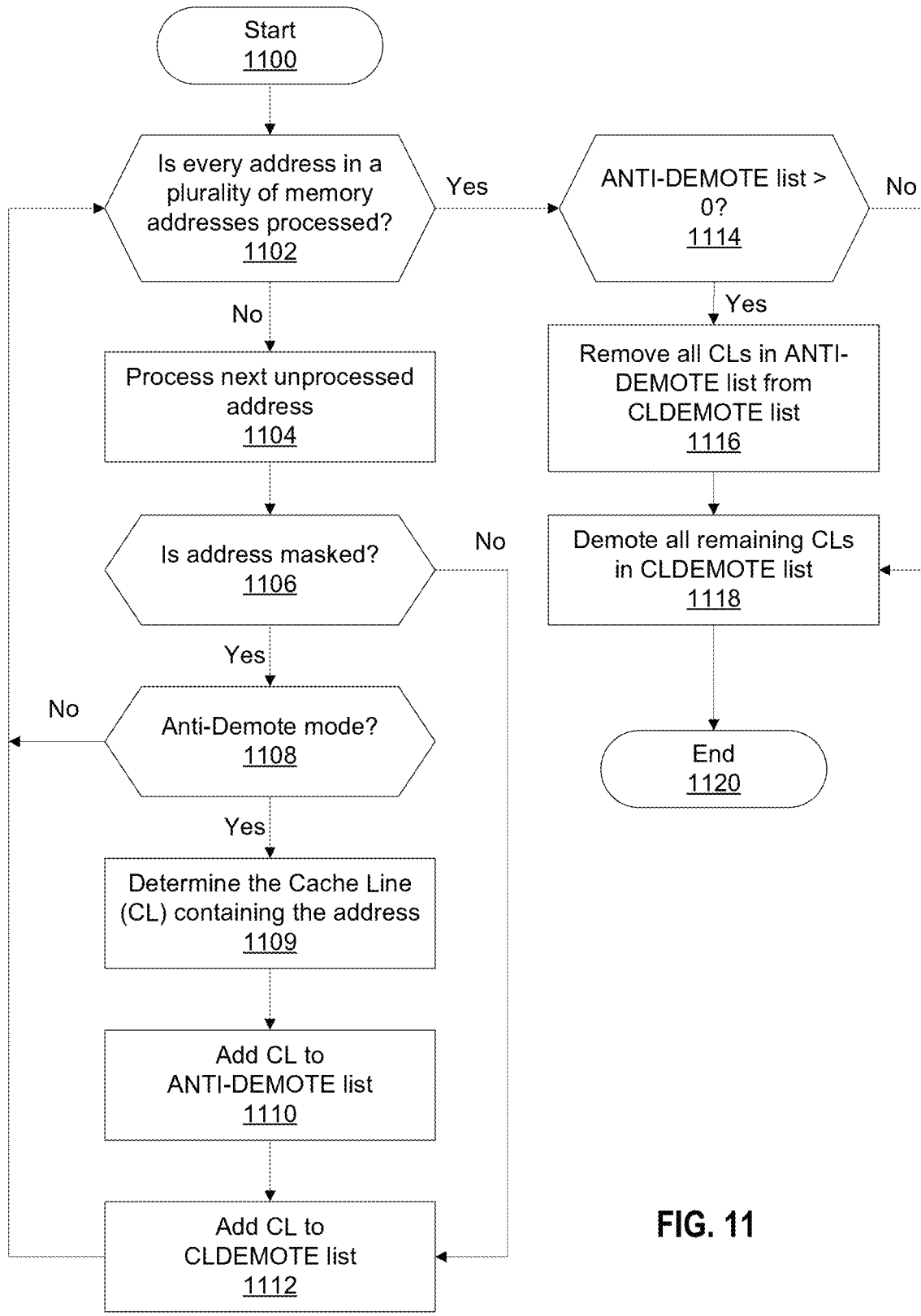
FIG. 11 is a flow diagram illustrating one embodiment of a method for processing and filtering a list of memory addresses to generate a list of cache lines to be operated on by a machine instruction.

FIG. 11 is one embodiment of a method for processing and filtering a list of memory address to generate a list of cache line to be operated on by a machine instruction. The method may be implemented by hardware, software, or both. In one embodiment, the list of cache line is generated in response to the execution of a VCLDEMOTE instruction. According to the embodiment, the generated list contains cache lines that are to be demoted or moved from one cache level in a cache hierarchy to another cache level. The method begins at block 1100. At block 1102, a determination is made on whether every one of a plurality of memory addresses have been processed. In one embodiment, the plurality of memory addresses are absolute addresses stored in a vector register (e.g., the vector register ZMMn 812 of the VCLDEMOTE instruction in FIG. 8). In another embodiment, the plurality of memory addresses is determined from address offsets stored in a vector register, wherein each of the address offsets is to be added to a base address to determine a memory address. Irrespective of how the plurality of memory addresses is obtained, if at least one of the memory addresses have not been processed, the method proceeds to block 1104 and processes the next unprocessed address. At block 1106, a determination is made on whether the memory address being processed is masked by one or more corresponding mask bits. In one embodiment, the mask bits are stored in a mask register (e.g., km 814) where each mask bit corresponds to one of the plurality of memory addresses in a vector register (e.g., ZMMn 812). According to another embodiment, the mask bits are stored within the vector register itself (e.g., ZMMn 812). For instance, the mask bits could be a portion of the bits (e.g., the 32 least significant bits) stored in the vector register. Thus, the vector register, in addition to storing a plurality of memory addresses or address offsets, also stores the mask bits. One or more mask bits are then assigned to a corresponding memory address or address offset in the vector register. A skilled in the art would recognize that the mask bits can be implemented in a variety of ways beyond what is described herein and still be consistent with the present invention. Referring back to block 1106, if an address being processed is not masked, the cache line associated with address is added to a CLDEMOTE list. However, if the address is indeed masked by one or more mask bits at block 1106, the method next determines whether an anti-demote mode has been activated. In one embodiment, the status of anti-demote mode is indicated by an indicator bit, such as a bit in the third operand of a VCLDEMOTE instruction. In another embodiment, anti-demote mode is assumed based on the type of instruction being executed. For instance, a VCLDEMOTE_AD instruction may be a variation of the VCLDEMOTE instruction with anti-demote is always performed. Irrespective of the specific implementation of an anti-demote mode indicator, if an address is masked by one or more corresponding mask bits while anti-demote mode is active, the cache line associated with that address is added to both an ANTI-DEMOTE list and a CLDEMOTE list in blocks 1110 and 1112, respectively. The method then proceeds back to block 1102 to determine if all addresses have been processed. However, in the case that the anti-demote mode is not active, an address masked by one or more corresponding mask bits is simply ignored and the next address, if any, is processed. This process repeats until all the addresses in the list of memory addresses have been processed. Then in block 1114, a determination is made on whether the ANTI_DEMOTE list contains at least one cache lines to be anti-demoted. If so, at block 1116, every cache line that appears on the ANTI-DEMOTE list is removed from the CLDEMOTE list. In some cases, an entry in the ANTI-DEMOTE list may cause multiple cache lines to be removed from the CLDEMOTE list. After all the anti-demoted cache lines have been removed, any cache lines that remain on the CLDEMOTE list is demoted at block 1118. As discussed above, according to an embodiment, the demoted cache lines are moved from one cache level to another cache level within a cache hierarchy. After all cache lines are demoted, the method terminates at block 1120.

The following pseudo-code illustrates the operation of one embodiment of the VCLDEMOTE instruction:

```
VCLDEMOTE ZMMn{km}, {reg/mm/0}, imm8
p = 0;
q = 0;
d = imm8;         // d = displacement value
D = ZMMn[d, j]; // ZMMn[d,j]denotes the jth d-width bit-field in ZMMn
J = k[d, j];      // k[d,j] denotes the jth d/8-width bit field in mask k
For j = 0, 1, 2, ... (512/d)-1
{ If (sign-extended(J) != 0) then
    Cache_Line_Address C[p] = Cache_Line_Mask (D+B);
    p += 1;
  Else // mask is 0, either (a) ignore address or
  // (b) undemote address
    if (anti-demote mode) {
       ANTI_DEMOTE[p] = 1;
       q += 1;
       C[p] = Cace_Line_Mask (D + B);
       p += 1;
    }
}
  End for
  If (q > 0 AND p > 0) { // one or more addresses need to be anti-demoted
  For r = 0, ... q-1 {
    if (ANTI_DEMOTE[r] = 1 {
       X = C[r];
       for s = 0, ... , p-1{
       if (C[s] == X)
          C[s] = 0;
    }
  }
}
```

In certain embodiments, a multi-core processor includes a plurality of hardware processor cores, each of which to include a first cache, and a second cache that is communicatively coupled to and shared by the plurality of hardware processor cores. The processor to support a first machine instruction, the first machine instruction includes a vector register operand identifying a vector register. The vector register contains a plurality of data elements each of which is used to identify a cache line. An execution of the first machine instruction by one of the plurality of hardware processor cores is to cause a plurality of identified cache lines to be demoted, such that the demoted cache lines are moved from the first cache to the second cache. In one instance, the first cache may be a level 1 cache and the second cache may be a level 2 cache. In another instance, the first cache may be a mid-level cache (MLC) and the second cache may be a last-level cache (LLC).

The processor may further include a mask register containing a plurality of mask bits, each mask bit corresponds to one of the plurality of data elements and is used to indicate whether the corresponding data element is active or inactive, such that an active data element identifies a cache line to be demoted and an inactive data element identifies a cache line not to be demoted. Each data element may be an address offsets relative to a base memory address. The first machine instruction may further include a base address operand identifying the base memory address or the base memory address may simply be zero. The first machine instruction may further comprise an immediate operand to indicate a data element size which is used to determine the plurality of data elements in the vector register. In some instances, the immediate operand may be an 8-bit value. Each of the plurality of hardware processor cores may include a decoder to decode the first machine instruction and execution hardware to execute a decoded first machine instruction to demote the plurality of identified cache lines.

In another embodiment, a non-transitory machine readable medium having program code stored thereon which, when executed by a machine, causes the machine to perform a method including decoding a first machine instruction which includes a vector register operand identifying a vector register, the vector register containing a plurality of data elements each used to identify a cache line; and executing the decoded first machine instruction to cause a plurality of identified cache lines to be demoted, such that the demoted cache lines are moved from a first cache to a second cache. In one instance, the first cache may be a level 1 cache and the second cache may be a level 2 cache. In another instance, the first cache may be a mid-level cache (MLC) and the second cache may be a last-level cache (LLC). The method may further include determining whether each of the plurality of data elements is active or inactive based on a plurality of mask bits in a mask register, where each mask bit corresponds to one of the plurality of data elements. An active data element identifies a cache line to be demoted and an inactive data element identifies a cache line not to be demoted. The method may further include identifying one of the plurality of cache lines by adding one of the plurality of data elements to a base memory address. The first machine instruction may include a base address operand identifying the base memory address or the base memory address may simply be zero. The method may also include determining a data element size from an immediate operand of the first machine instruction, the data element size is used to determine the plurality of data elements in the vector register. In some instances, the immediate operand may be an 8-bit value.

In yet another embodiment, a system includes a plurality of hardware processor cores, each of which to include a first cache, and a second cache that is communicatively coupled to and shared by the plurality of hardware processor cores. The first hardware processor core of plurality of hardware processor cores to support a first machine instruction, the first machine instruction includes a vector register operand identifying a vector register. The vector register contains a plurality of data elements each of which is used to identify a cache line. An execution of the first machine instruction by one of the plurality of hardware processor cores is to cause a plurality of identified cache lines to be demoted, such that the demoted cache lines are moved from the first cache to the second cache. In one instance, the first cache may be a level 1 cache and the second cache may be a level 2 cache. In another instance, the first cache may be a mid-level cache (MLC) and the second cache may be a last-level cache (LLC). The processor may further include a mask register containing a plurality of mask bits, each mask bit corresponds to one of the plurality of data elements and is used to indicate whether the corresponding data element is active or inactive, such that an active data element identifies a cache line to be demoted and an inactive data element identifies a cache line not to be demoted. Each data element may be an address offsets relative to a base memory address. The first machine instruction may further include a base address operand identifying the base memory address or the base memory address may simply be zero. The first machine instruction may further comprise an immediate operand to indicate a data element size which is used to determine the plurality of data elements in the vector register. In some instances, the immediate operand may be an 8-bit value.

Figure 12:
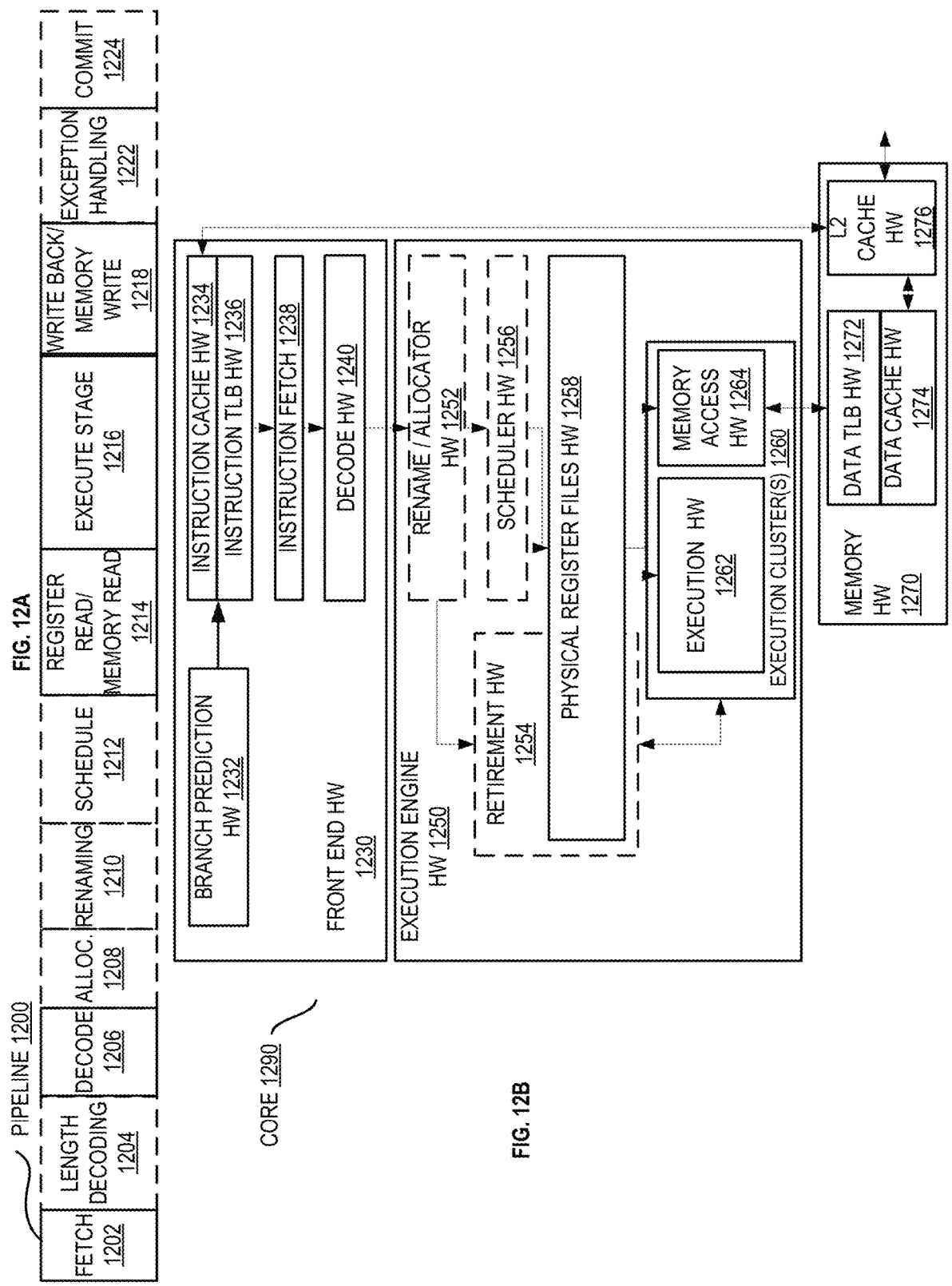
FIG. 12A is a block diagram illustrating both an exemplary in-order pipeline and an exemplary register renaming, out-of-order issue/execution pipeline according to embodiments of the invention.
FIG. 12B is a block diagram illustrating both an exemplary embodiment of an in-order architecture core and an exemplary register renaming, out-of-order issue/execution architecture core to be included in a processor according to embodiments of the invention.

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end hardware 1230 coupled to an execution engine hardware 1250, and both are coupled to a memory hardware 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end hardware 1230 includes a branch prediction hardware 1232 coupled to an instruction cache hardware 1234, which is coupled to an instruction translation lookaside buffer (TLB) 1236, which is coupled to an instruction fetch hardware 1238, which is coupled to a decode hardware 1240. The decode hardware 1240 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode hardware 1240 or otherwise within the front end hardware 1230). The decode hardware 1240 is coupled to a rename/allocator hardware 1252 in the execution engine hardware 1250.

The execution engine hardware 1250 includes the rename/allocator hardware 1252 coupled to a retirement hardware 1254 and a set of one or more scheduler hardware 1256. The scheduler hardware 1256 represents any number of different schedulers, including reservations stations, central instruction window, etc. The scheduler hardware 1256 is coupled to the physical register file(s) hardware 1258. Each of the physical register file(s) hardware 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1258 comprises a vector registers hardware, a write mask registers hardware, and a scalar registers hardware. These register hardware may provide architectural vector registers, vector mask registers, and general purpose registers. The physical register file(s) hardware 1258 is overlapped by the retirement hardware 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1254 and the physical register file(s) hardware 1258 are coupled to the execution cluster(s) 1260. The execution cluster(s) 1260 includes a set of one or more execution hardware 1262 and a set of one or more memory access hardware 1264. The execution hardware 1262 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1256, physical register file(s) hardware 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1264). It should also be understood that where separate pipelines are used, one or more of these pipelines may be out-of-order issue/execution and the rest in-order.

The set of memory access hardware 1264 is coupled to the memory hardware 1270, which includes a data TLB hardware 1272 coupled to a data cache hardware 1274 coupled to a level 2 (L2) cache hardware 1276. In one exemplary embodiment, the memory access hardware 1264 may include a load hardware, a store address hardware, and a store data hardware, each of which is coupled to the data TLB hardware 1272 in the memory hardware 1270. The instruction cache hardware 1234 is further coupled to a level 2 (L2) cache hardware 1276 in the memory hardware 1270. The L2 cache hardware 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode hardware 1240 performs the decode stage 1206; 3) the rename/allocator hardware 1252 performs the allocation stage 1208 and renaming stage 1210; 4) the scheduler hardware 1256 performs the schedule stage 1212; 5) the physical register file(s) hardware 1258 and the memory hardware 1270 perform the register read/memory read stage 1214; the execution cluster 1260 perform the execute stage 1216; 6) the memory hardware 1270 and the physical register file(s) hardware 1258 perform the write back/memory write stage 1218; 7) various hardware may be involved in the exception handling stage 1222; and 8) the retirement hardware 1254 and the physical register file(s) hardware 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1234/1274 and a shared L2 cache hardware 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13:
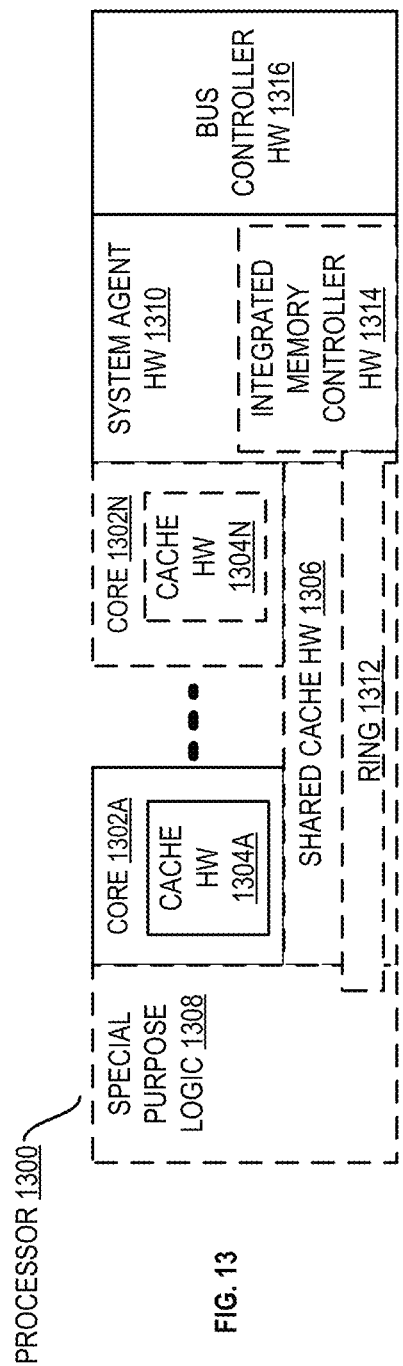
FIG. 13 is a block diagram of a single core processor and a multicore processor with integrated memory controller and graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller hardware 1316, while the optional addition of the dashed lined boxes illustrates an alternative processor 1300 with multiple cores 1302A-N, a set of one or more integrated memory controller hardware 1314 in the system agent hardware 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1306, and external memory (not shown) coupled to the set of integrated memory controller hardware 1314. The set of shared cache hardware 1306 may include one or more mid-level caches, such as level 2 (L2), level 3 (L3), level 4 (L4), or other levels of cache, a last level cache (LLC), and/or combinations thereof. While in one embodiment a ring based interconnect hardware 1312 interconnects the integrated graphics logic 1308, the set of shared cache hardware 1306, and the system agent hardware 1310/integrated memory controller hardware 1314, alternative embodiments may use any number of well-known techniques for interconnecting such hardware. In one embodiment, coherency is maintained between one or more cache hardware 1306 and cores 1302-A-N.

In some embodiments, one or more of the cores 1302A-N are capable of multi-threading. The system agent 1310 includes those components coordinating and operating cores 1302A-N. The system agent hardware 1310 may include for example a power control unit (PCU) and a display hardware. The PCU may be or include logic and components needed for regulating the power state of the cores 1302A-N and the integrated graphics logic 1308. The display hardware is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set. In one embodiment, the cores 1302A-N are heterogeneous and include both the "small" cores and "big" cores described below.

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
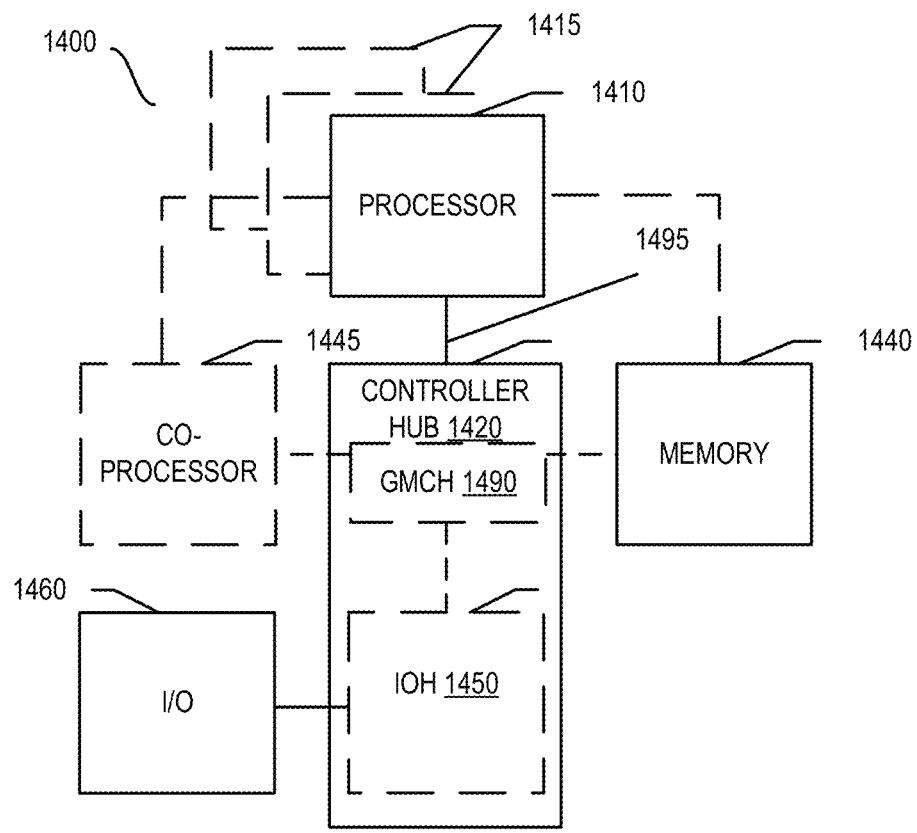
FIG. 14 illustrates a block diagram of a system in accordance with one embodiment of the present invention.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface, or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
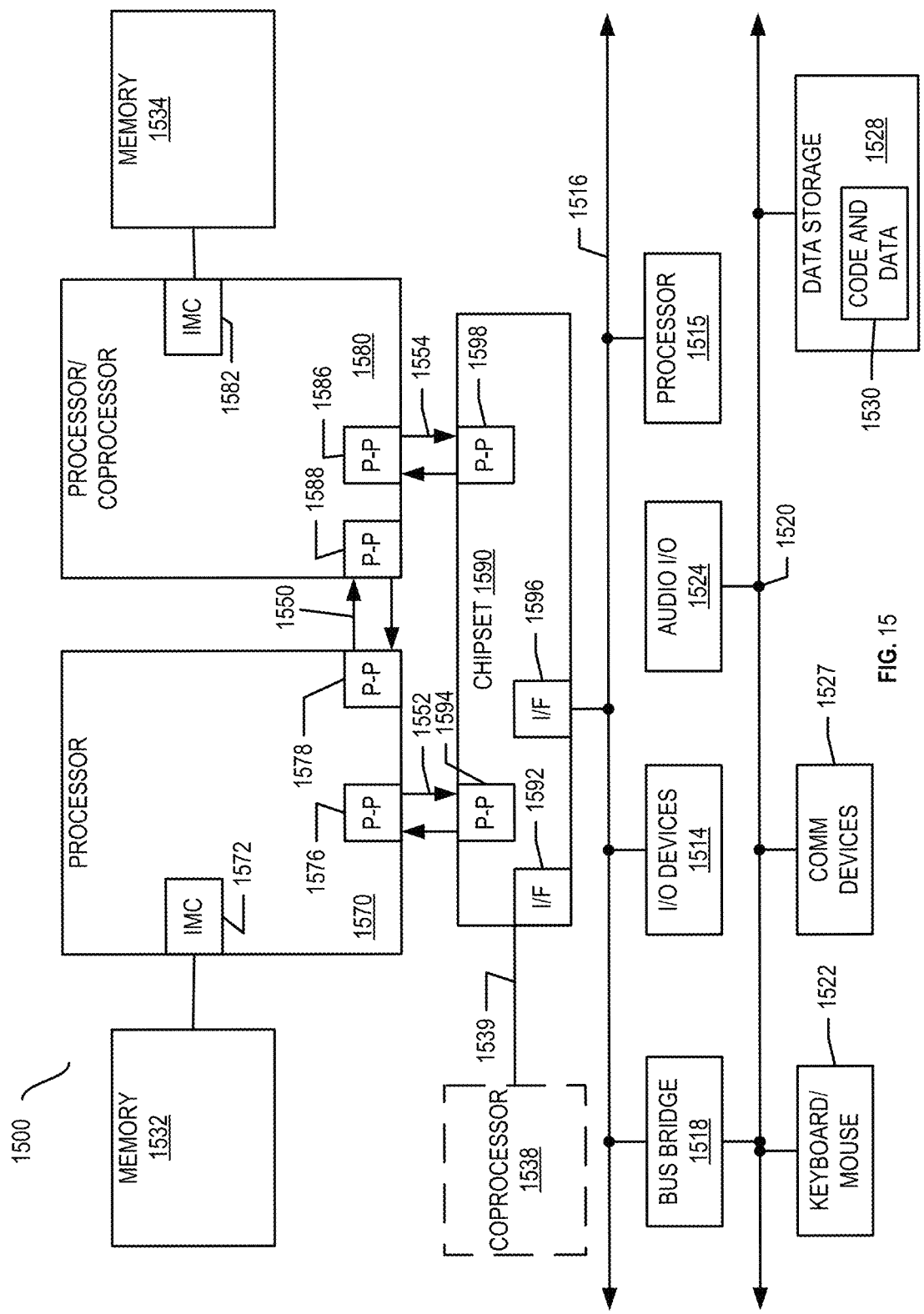
FIG. 15 illustrates a block diagram of a second system in accordance with an embodiment of the present invention.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) hardware 1572 and 1582, respectively. Processor 1570 also includes as part of its bus controller hardware point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) hardware), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage hardware 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multidrop bus or other such architecture.

Figure 16:
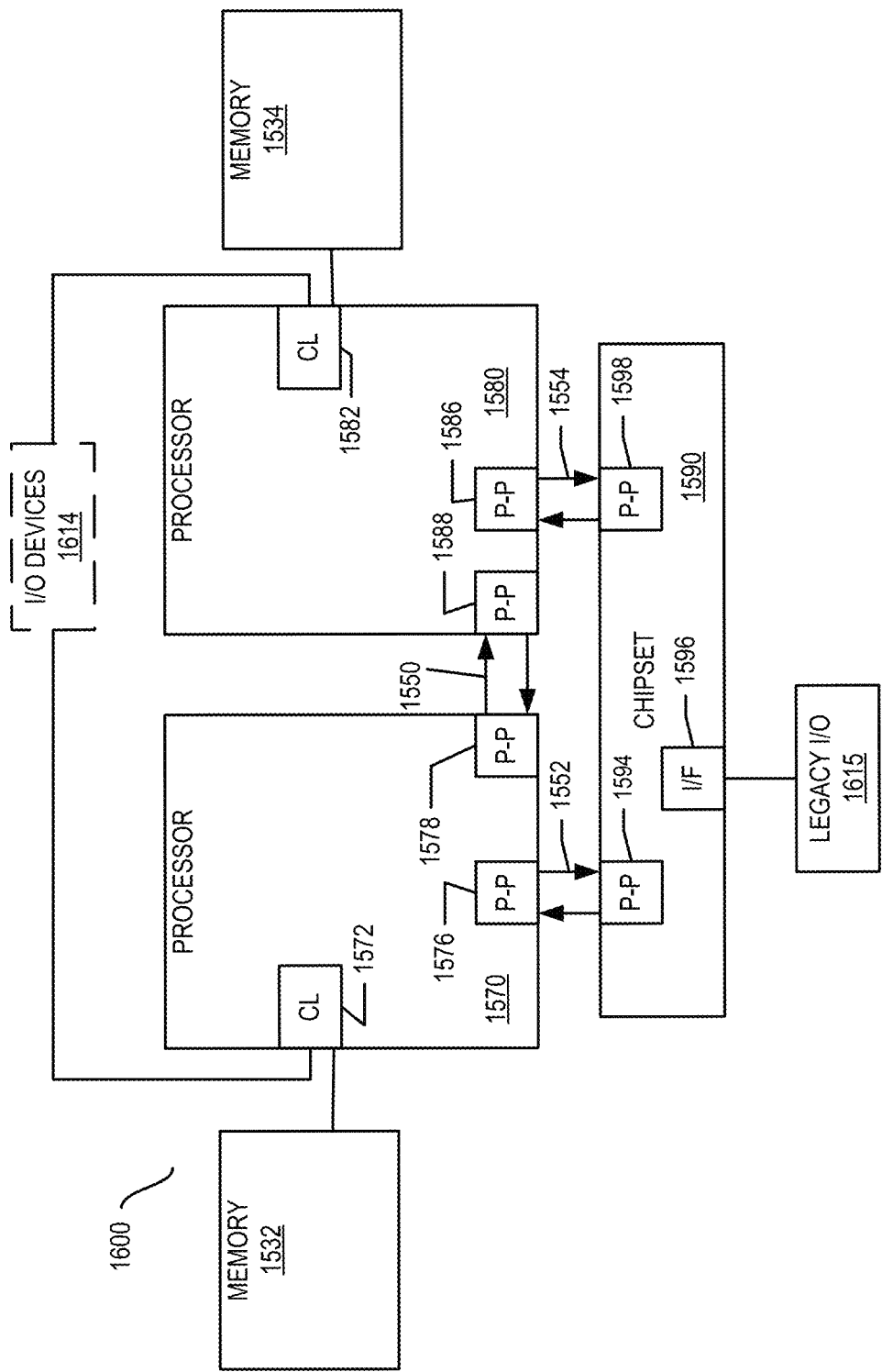
FIG. 16 illustrates a block diagram of a third system in accordance with an embodiment of the present invention.

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller hardware and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
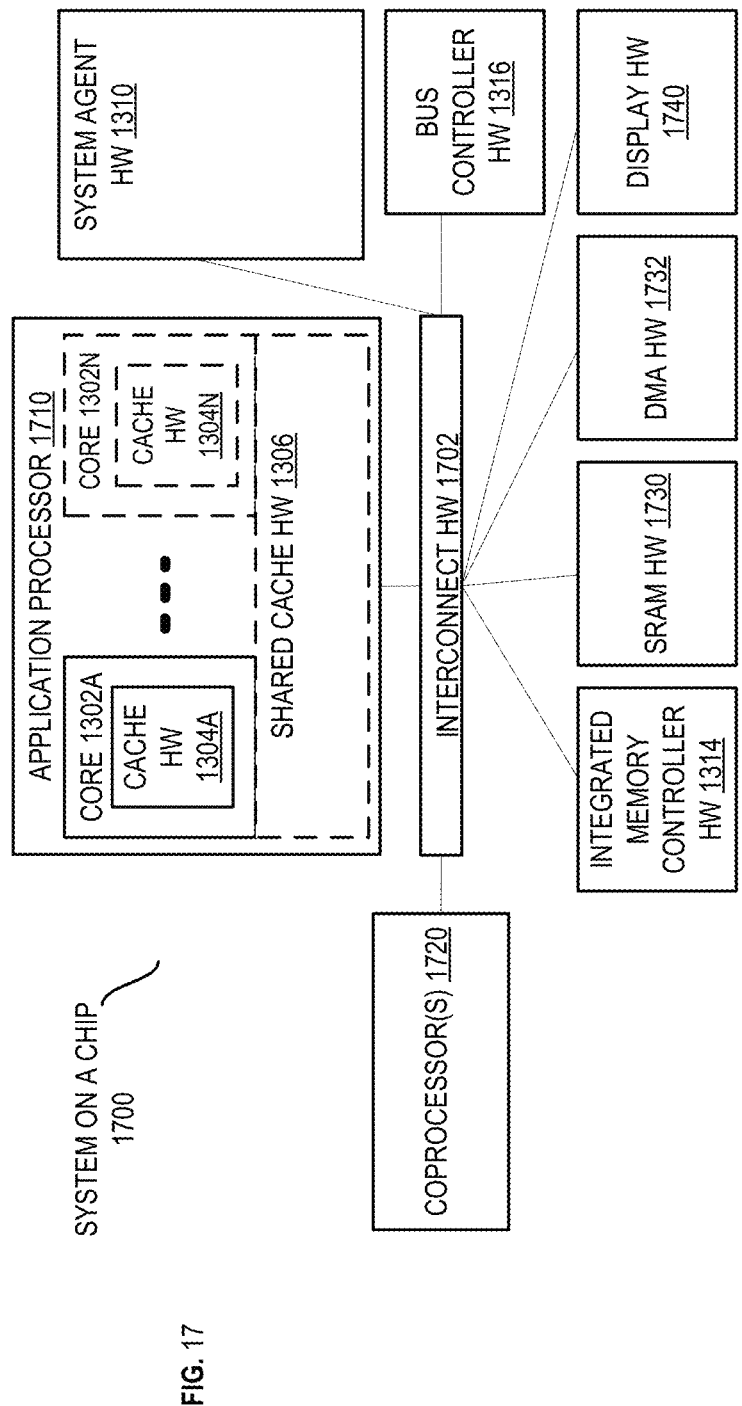
FIG. 17 illustrates a block diagram of a system on a chip (SoC) in accordance with an embodiment of the present invention.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect hardware 1702 is coupled to: an application processor 1710 which includes a set of one or more cores 1302A-N and shared cache hardware 1306; a system agent hardware 1310; a bus controller hardware 1316; an integrated memory controller hardware 1314; a set or one or more coprocessors 1720 which may include integrated graphics logic, an image processor, an audio processor, and a video processor; an static random access memory (SRAM) hardware 1730; a direct memory access (DMA) hardware 1732; and a display hardware 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
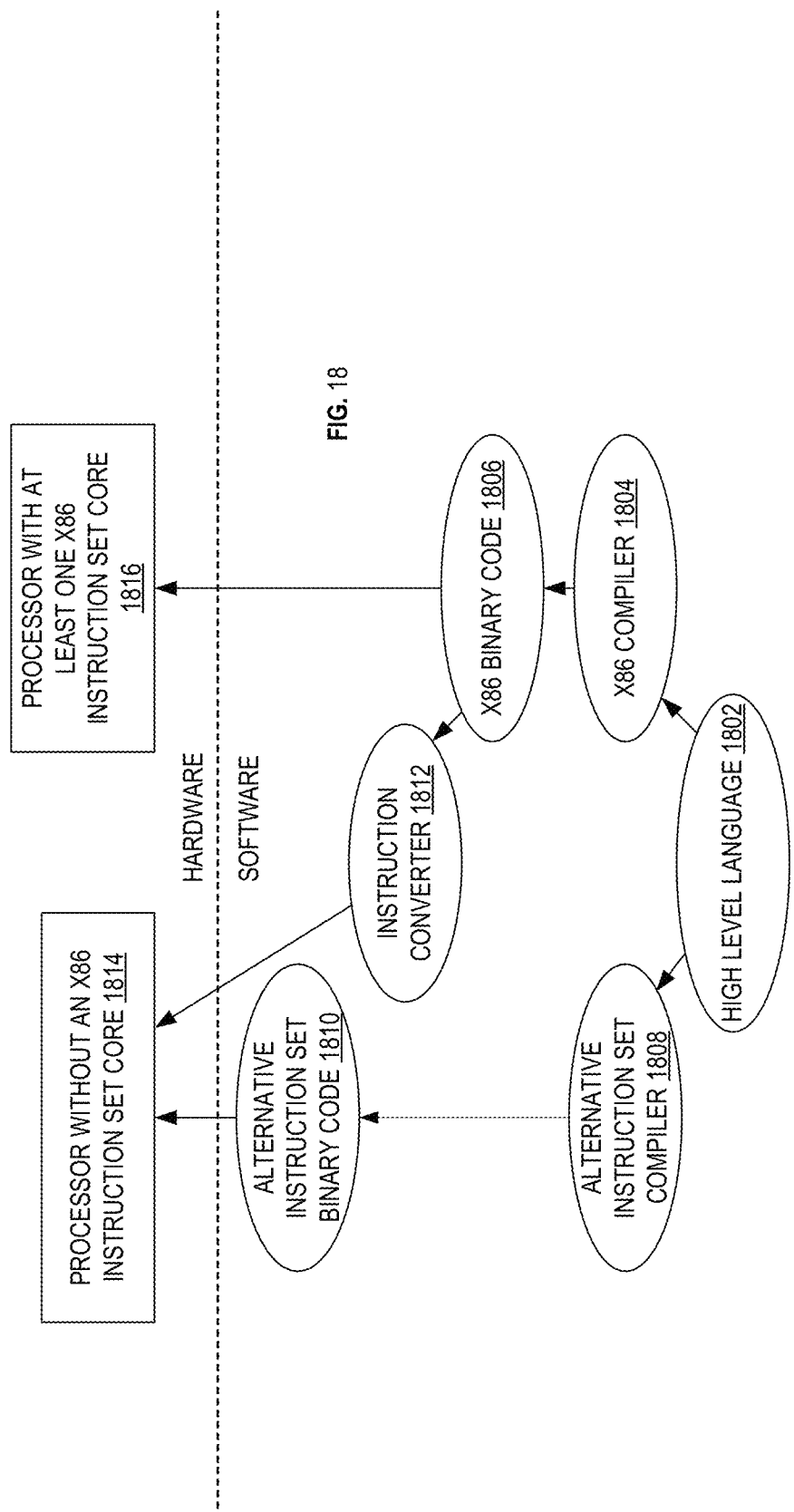
FIG. 18 illustrates a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816.

Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation Apparatus and Method for Efficiently Reclaiming Demoted Cache Lines As described above, the objective of the CLDEMOTE instruction is to reduce pollution of cachelines in L1/L2 levels by moving cachelines out of L1/L2 following use in a given core, so that the limited L1/L2 capacity becomes available for other latency sensitive CPU operations (especially high speed network traffic). In steady state, CLDEMOTE will cause evictions of other cache lines, many of which may have been already demoted by prior CLDEMOTE executions.

A problem arises for cachelines in more distant regions of the memory hierarchy including, for example, a remote memory pool tier, a 3D XPoint tier, or those cachelines that are mapped to storage or a memory of a smart network interface controller (NIC). Writing modified lines out can be a time consuming operation and sensitive to media state. For example, if there is an ongoing write to a nearby area in 3D XPoint, or if there is a bandwidth bottleneck in accessing a remote memory pool, a reclaim operation will introduce unexpected latencies. While a first cacheline C that is being CLDEMOTED into the outermost cache level may itself not require an immediate writeback, over time as demoted, modified cachelines C, D, E, F, etc. accumulate in the outermost cache level, eventually a large number of writebacks may need to be performed as capacity is exhausted and this can be expected to stall fresh allocations into the outermost cache(s).

One embodiment of the invention provides a new mode for the CLDEMOTE instruction to facilitate faster reclaiming of cache lines. The new mode may be specified directly in the instruction encodings, through a flags argument in the instruction, or using a new version of the CLDEMOTE instruction. The mnemonic CLDEMOTE+ will be used herein to denote a CLDEMOTE instruction capable of performing the operations described herein.

In one embodiment, if a modified cacheline is demoted, then a writeback of the cacheline is performed if it is determined to be homed in an outer memory tier, a remote memory pool, a smart NIC, or other form of off-chip or off-package memory. This operation may be limited to cases where the cache line is moving to a specific cache level (e.g., the LLC). In one embodiment, the new mode is implemented only in response to a request by software to enter an auto-writeback mode.

The choice of the type of memory tier on which to perform these auto-writeback operations may be dynamic. For example, the decision may be determined on the basis of a configuration parameter initialized at system restart, set by an Machine State Register (MSR) during system operation, and/or based on threshold values such as a bandwidth or average latency to the target memory tier. Note that CLDEMOTE+ itself completes out of order, as does the cache line write back (CLWB) operation, since neither stalls software execution.

Figure 19:
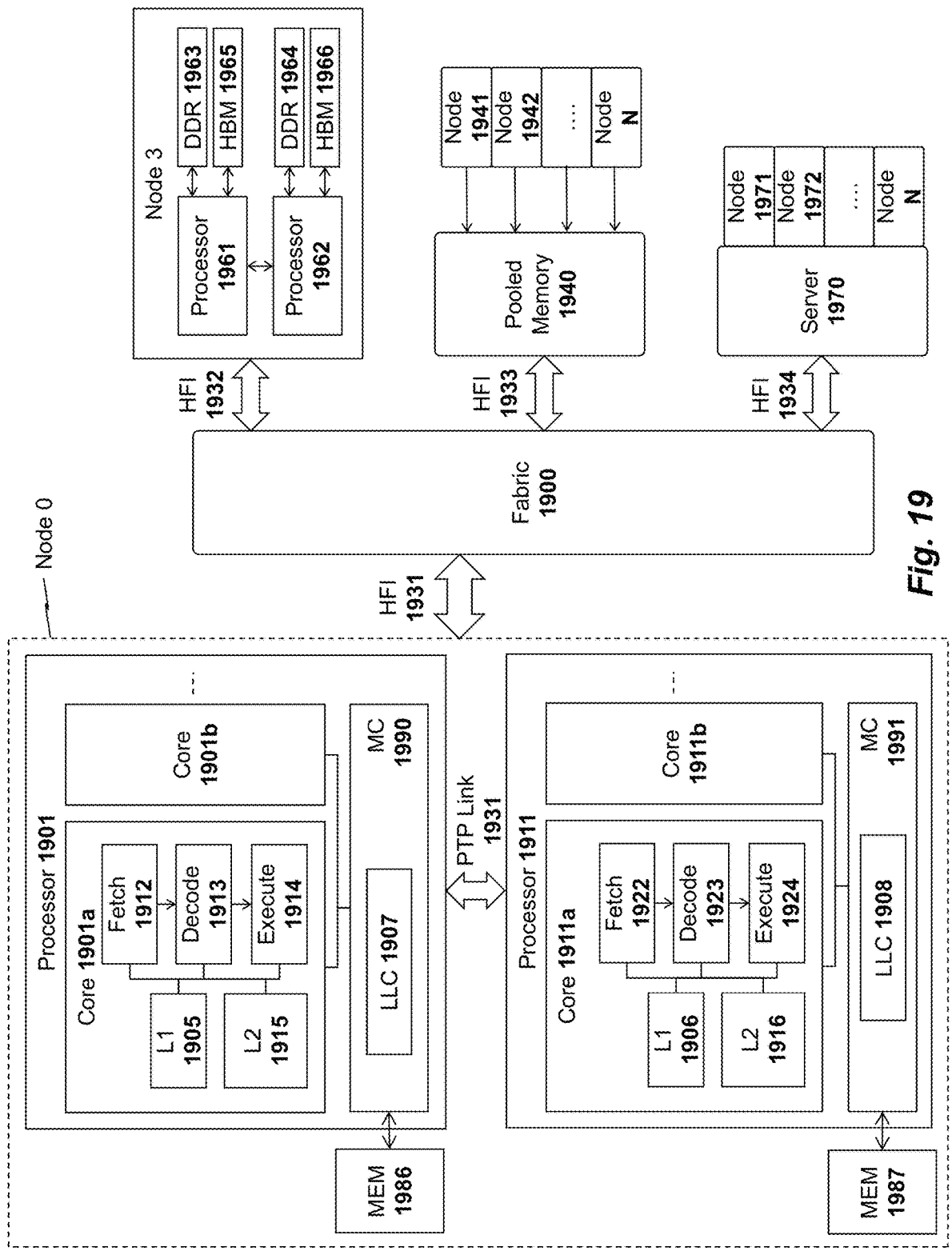
FIG. 19 illustrates an example architecture for implementing embodiments of the invention.

As shown in FIG. 19, one embodiment of an architecture on which the CLDEMOTE instruction is executed includes multiple cache/memory tiers including Level 1 (L1) caches 1905-1906 and Level 2 (L2) caches 1915-1916 integral to each core 1901*a-b* and 1911*a-b*, respectively (although only details for core 1901*a* and 1911*a* are shown). Each processor 1901, 1911 includes a shared Level 3 (L3) or LLC cache 1907, 1908, respectively, as well as fetch circuitry 1912, 1922, a decoder 1913, 1923, and execution circuitry 1914, 1924, respectively. In the illustrated embodiment, the processors 1901, 1911 are coupled over a point-to-point interconnect/link 1931 such as a QuickPath interconnect (QPI) or UltraPath interconnect (UPI), forming a first node (Node 0). In addition, each processor 1901, 1911 includes a memory controller 1990-1991 to manage memory transactions initiated by the cores 1901*a-b*, 1911*a-b*, respectively, or received from remote nodes (e.g., Node 3) and directed to local memories 1986-1987 (e.g., which may be double data rate (DDR) memory, high bandwidth memory (HBM), or any other type of memory).

In the illustrated embodiment, Node 0 comprising the interconnected processors 1901, 1911 is coupled to a high speed, low latency memory fabric 1900 over a host fabric interface (HFI) 1931. In one embodiment, the HFI 1931 comprises an inter-node high speed network interface, through which memory space requests are forwarded from a first or "local" node to a second or "remote" node, and through which data, messages, packets, etc., are sent back to the local node, by the second node through the latter's HFI. For example, Node 0 (the local node) may transmit memory requests to Node 3 (the "remote" node) via the memory fabric 1900 and Node 3's HFI 1932. Node 3 may then transmit a response to Node 0 via HFI 1932, fabric 1900, and HFI 1931. In the illustrated example, Node 3 includes two processors 1961-1962 coupled to standard double data rate (DDR) memory 1963-1964 and/or high bandwidth memory (HBM) 1965-1966 which may be mapped to a portion of the virtual address space shared by Node 0 and Node 3.

In addition, a pooled memory 1940 comprising a plurality of memory nodes 1941-1942, N is coupled to the memory fabric 1900 over link 1933 and a server 1940 comprising a plurality of nodes 1971-1972, N is coupled to the memory fabric 1900 over HFI 1934. The nodes of the pooled memory 1940 and server 1970 may be a phase change-based memory such as 3DXP or PCMS. However, various other memory types may be used including, but not limited to, a ferroelectric based memory (e.g., FRAM), a magnetic based memory (e.g., MRAM), a spin transfer torque based memory (e.g., STT-RAM), a resistor based memory (e.g., ReRAM), and/or a "Memristor" based memory.

FIG. 19 may represent, for example, high performance computing (HPC) clusters or Data Centers comprising N servers, each in a coherence domain. The servers communicate with each other using a fabric over which each server exposes some portion of its memory space to other servers; however, accesses between the different servers may not be coherent. Various different fabric types may be used such as Ethernet or an InfiniBand fabric interconnect which allows mapping of memory address ranges between different coherent domains.

As mentioned, one embodiment of the invention extends the CLDMOTE circuitry/logic to specify that if a particular line that is being demoted is dirty it should be kept in the LLC (or other cache level) in a clean mode while generating a writeback to the specified memory tier. For example, if a particular cache line being demoted by core 1901*a* is dirty, the memory controller 1990 keeps it in the LLC 1907 in a clean mode and generates a writeback to the specified memory (e.g., HBM 1965, Node 1941, etc).

In one embodiment, each memory tier in the hierarchy includes new circuitry/logic and corresponding interfaces that allows a memory transaction to specify that a particular writeback operation needs to continue its path until reaching its targeted tier. Without the embodiments of the invention, the writeback operation is not guaranteed to continue beyond the current memory tier.

Figure 20:
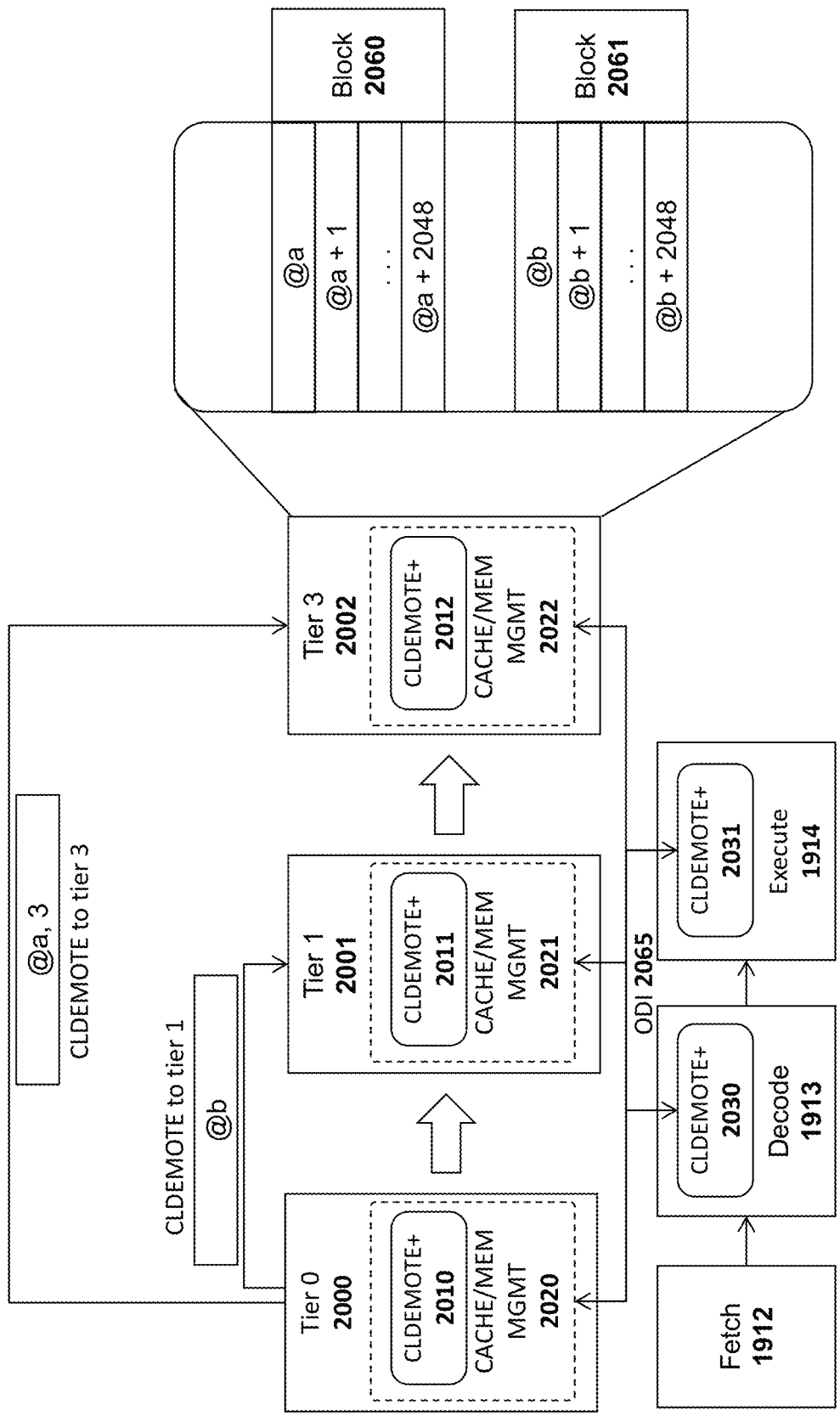
FIG. 20 illustrates one embodiment in which cache lines are demoted across tiers in accordance with one embodiment.

FIG. 20 illustrates an example with three cache/memory tiers 2000-2002, each with CLDEMOTE+ circuitry/logic 2010-2012 for implementing the techniques described herein in response to a CLDEMOTE+ instruction. In this embodiment, the correct memory tier to evict the cache line is indicated by the CLDEMOTE+ instruction and implemented by cache/memory management circuitry 2020-2022. On certain architectures the cache/memory management circuitry 2020-2022 comprises a set of interconnected caching agents (CAs), including a caching home agent (CHA). As illustrated, an on-die interconnect (ODI) 2065 couples the various cache/memory management circuits 2020-2022.

The indication of the memory tier may be encoded in an immediate value, an additional operand (e.g., where the memory tier is stored in a register), or using a new/modified instruction encoding. In FIG. 20, for example, execution of a first CLDEMOTE+ instruction specifies demotion of a first cache line from tier 0 2000 to tier 1 2001 and a second CLDEMOTE+ instruction specifies demotion of a second cache line from tier 0 2000 to tier 3 2002. In this example, the first CLDEMOTE+ instruction is for a cache line stored within a first memory block 2060 and the second CLDEMOTE+ instruction is for a cache line stored within a second memory block 2061.

As illustrated in FIG. 20, CLDEMOTE+ circuitry, 2030 and 2031, may be included within the core's decoder 1913 and/or execution circuitry, respectively 1914. In addition, the cache/memory management circuitry 2020-2022 associated with each cache/memory tier 2000-2002 may include CLDEMOTE+ circuitry/logic to implement the techniques described herein. On-die interconnect (ODI) circuitry which generates and receives transactions on the ODI interconnect may also be updated as described herein.

The different cache/memory tiers 2000-2002 may be any one of the cache/memory tiers described above with respect to FIG. 19 including the L1 caches, L2 caches, LLCs, local memories, remote memory (e.g., DDR 1963, HBM 1965), and remote memory pools (e.g., pooled memory 1940, server memory 1970, etc). In embodiments in which memory is exposed by the local HFI or NIC, the memory fabric 1900 flows (e.g., such as RDMA) and the HFI/NIC circuitry/logic may also be extended (e.g., acting similarly to the flows described by memory controllers).

As mentioned, to implement the above-described flow, one embodiment of the decoder 1913 and/or execution circuitry 1914 includes circuitry/logic 2030-2031 for decoding and/or executing, respectively, the CLDEMOTE+ instruction to identify the memory tier to which the cache line is to be evicted when dirty.

In one implementation, demotions within the L1, L2 and LLC caches are handled using the following techniques. For example, in one embodiment, if the cache line is hosted in the L1 cache and is being demoted to the L2 cache, the core 1901a stores the line in a clean mode in the L2 cache and generates a message to the cache/memory management circuitry 2020-2022 (e.g., a caching agent/home agent) specifying that the given cache line being demoted is to be written back to a specific memory tier (e.g., pooled memory 1940). In one embodiment, the on-die interconnect (ODI) 2060 coupled to the cache/memory management circuitry 2020-2022 is used to communicate the indication of the memory tier. For example, the L2 cache management circuitry/logic may receive an indication over the ODI 2060 that a given cache line will be demoted and maintained in the LLC 1907 in clean mode but will be written back to the memory tier. In one embodiment, the cache/memory management circuitry 2020-2022 of a current tier forwards a cache line write operation to the next tier in sequence when the current tier is not the target for the write operation.

The CLDEMOTE+ instruction described herein may be used by software to signal a reduced preference for a cache line without fully evicting the cache line. A complementary aspect is to ensure that the cache line is cleaned asynchronously during the time it is still in the LLC and is thus ready to be reclaimed if indeed it is the right candidate.

While the embodiments of CLDEMOTE+ are described above with respect to a single cache line, the underlying principles may be implemented for multiple cache lines. For example, in one embodiment, the CLDEMOTE+ instruction is extended for scatter operations (e.g., using a multi-cacheline write), maximizing the chance that a cacheline is clean if it needs to be recycled for some other data after it has been demoted in the recent past.

If the cache line is referenced again for reading or writing by a CPU core, it will access the L1 or L2 cache anyway. While this means there is a small likelihood that a cache line is written back more than once under this proposal than what would happen without this feature, software may correct for cachelines to which it is writing so frequently (e.g., using default behavior). In steady state, this optimization should cause most demoted cachelines in the LLC to be clean. Those that are not have been in LLC for long period (or else they would not be in the LLC). So they are either clean, or have to be evicted and written back when this cacheline was pushed to LLC. In essence, the techniques described herein maximize the chance that when a line is evicted, it is a clean line.

CLDEMOTE+ may execute out of order. There is no issue of correctness since it is only specifying a cache line disposition within the cache hierarchy. In other words, if the cache line is dirty, then it is cleaned but it is still maintained in the hierarchy.

In an embodiment that includes an agent-based architecture in which agents are interconnected via an on-die interconnect, the following terms have the following meanings:

CACHING AGENTS (CA/CHA): Coherency agents within a node that process memory space requests from the cores within the same node.

ODI: On-Die-Interconnect

SUPER QUEUE (SQ): Cores use the SQ structure to store ODI requests that are sent to the CHA.

HOME AGENTS (HA): A home agent is responsible for handling memory requests from the CHAs and acting as a Home for a part of the memory space. One die can have multiple Homes across which the system memory space physical addresses are distributed.

COHERENCE DOMAIN, COHERENT DOMAIN: Informally, the groups of cores in a system together with memory spaces to which they can perform load and store operations, where, the LOAD of any location returns the most recent value sent to that location by another core or CHA in the group.

UPI, QPI, KTI: Inter socket high speed links over which requests and/or data may be forwarded from/to a core in a first socket to/from caches or HAs in a second socket in the node that implements a common coherency domain for the sockets.

HOST FABRIC INTERFACE (HFI): Inter-node high speed network interface, through which memory space requests are forwarded from a first or "local" node to a second or "remote" node, and through which data, messages, packets, etc. are sent back to the local node, by the second node through the latter's HFI.

3DXP POOLED MEMORY: High capacity memory, accessible through HFI, and shared across nodes.

SYSTEM, CLUSTER: A multi-node system or cluster consists of two or more coherent domains between which requests and responses are communicated over their HFIs. Such requests and responses may travel through switches that route data between the HFIs. For example HPC or Data Centers may include N clusters or servers that can communicate with each other using the fabric. Using the fabric (like Omnipath), each coherent domain can expose some address regions to the other coherent domains.

MEMORY CONTROLLERS: Interfaces for the physical memories

FLAT vs. CACHED MODES: Memories can work in two main modes: flat mode or memory side cache. Flat memories act as memory storage devices. In the memory side cache mode, a memory device may act as a cache for flat memories that reside in other domains. Memory controllers providing access to this last type of memories implement both memory-side caching logic and memory access logic.

Figure 21:
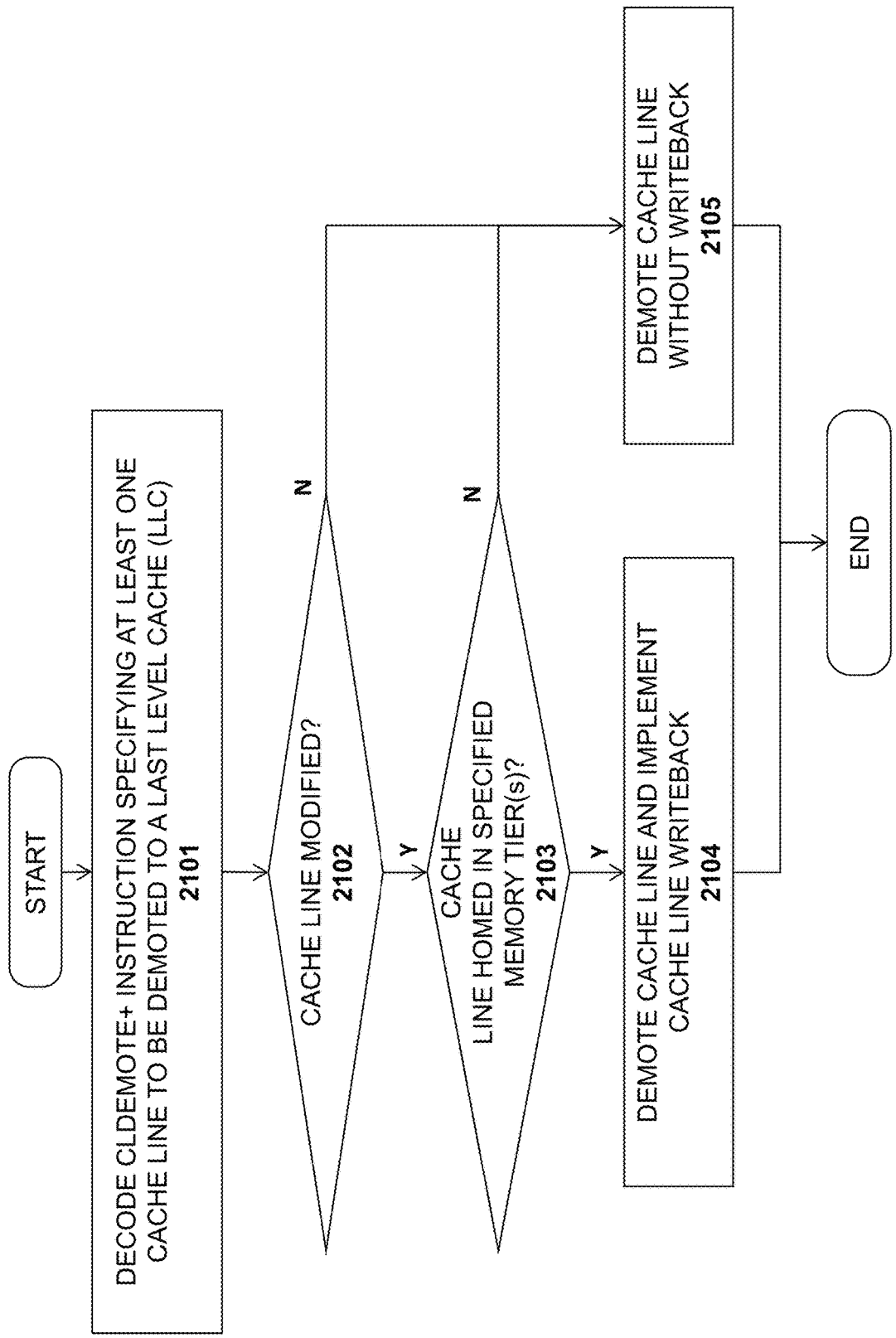
FIG. 21 illustrates a method in accordance with one embodiment of the invention.

A method in accordance with one embodiment of the invention is illustrated in FIG. 21. The method may be implemented within the context of the processor and system architectures described above but is not limited to any particular architecture.

At 2101 a CLDEMOTE+ instruction is decoded, specifying at least one cache line to be demoted to a last level cache (LLC). While this embodiment focuses on demotion to an LLC, the underlying principles of the invention are not limited to this implementation. For example, any cache level (other than an L1 cache) may be designated to trigger the techniques described herein.

At 2102 a determination is made as to whether the cache line is modified. If not, then at 2105 the cache line is demoted to the LLC without implementing an automatic writeback operation. If so, then at 2103 a determination is made as to whether the cache line is homed in a specified memory tier (or group of memory tiers). For example, the cache line may be homed in a particular remote or local memory tier (see, e.g., pooled memory 1940, server 1970, Node 3 in FIG. 19). If not, then the cache line is demoted without an automatic writeback at 2105. If so, then at 2104 the cache line is demoted and a cache line writeback is implemented as described herein.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Components, features, and details described for any of the apparatus may also optionally apply to any of the methods, which in embodiments may be performed by and/or with such apparatus. Any of the processors described herein may be included in any of the systems disclosed herein. In some embodiments, the computer system may include an interconnect, a processor coupled with the interconnect, and a dynamic random access memory (DRAM) coupled with the interconnect. Alternatively, instead of DRAM, other types of volatile memory that don't need to be refreshed may be used, or flash memory may be used.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to particular embodiments. Specifics in these examples may be used anywhere and in any combination.

Example 1 is a processor comprising: a cache hierarchy including at least one Level 1 (L1) cache and one or more lower level caches; a decoder to decode a cache line (CL) demote instruction specifying at least a first cache line; and execution circuitry to demote the first cache line responsive to the CL demote instruction, the execution circuitry to implement a writeback operation on the first cache line if the first cache line has been modified and homed in an instruction-specified memory tier.

Example 2

The processor of Example 1 wherein the execution circuitry is to demote the first cache line from the L1 cache to a last level cache (LLC) or a Level 2 (L2) cache.

Example 3

The processor of Example 1 wherein the memory tier comprises an off-chip memory.

Example 4

The processor of Example 3 wherein the off-chip memory comprises one or more of a pooled memory node, a remote server node, a high capacity persistent memory (e.g., 3DXP) and a high bandwidth memory (HBM).

Example 5

The processor of Example 3 further comprising: a host fabric interface (HFI) to couple the processor to a memory fabric, the memory fabric coupled to nodes including the off-chip memory.

Example 6

The processor of Example 5 further comprising: a point-to-point link to couple the processor to at least one additional processor.

Example 7

The processor of Example 1 further comprising: an on-die interface (ODI) to couple the execution circuitry to cache/memory management circuitry of the specified memory tier.

Example 8

The processor of Example 7 wherein the specified memory tier is identified in an immediate value, an operand, or within the CL demote instruction encoding.

Example 9

A method comprising: decoding a cache line (CL) demote instruction specifying at least a first cache line; and demoting the first cache line responsive to the CL demote instruction; and implementing a writeback operation on the first cache line if the first cache line has been modified and homed in an instruction-specified memory tier.

Example 10

The method of Example 9 wherein the first cache line is to be demoted from a L1 cache to a last level cache (LLC) or a Level 2 (L2) cache.

Example 11

The method of Example 9 wherein the memory tier comprises an off-chip memory.

Example 12

The method of Example 11 wherein the off-chip memory comprises one or more of a pooled memory node, a remote server node, and a high bandwidth memory (HBM).

Example 13

The method of Example 11 wherein demoting the first cache line includes communicating with the off-chip memory over a host fabric interface (HFI).

Example 14

The method of Example 13 further comprising: communicating over a point-to-point link to specify the demotion of the first cache line.

Example 15

The method of Example 9 further comprising: communicating over an on-die interface (ODI) to specify the demotion of the first cache line.

Example 16

The method of Example 15 wherein the specified memory tier is identified in an immediate value, an operand, a status register, or within the CL demote instruction encoding.

Example 17

A machine-readable medium having program code stored thereon which, when executed by a machine, causes the machine to perform the operation of: decoding a cache line (CL) demote instruction specifying at least a first cache line; and demoting the first cache line responsive to the CL demote instruction; and implementing a writeback operation on the first cache line if the first cache line has been modified and homed in an instruction-specified memory tier.

Example 18

The machine-readable medium of Example 17 wherein the first cache line is to be demoted from a L1 cache to a last level cache (LLC) or a Level 2 (L2) cache.

Example 19

The machine-readable medium of Example 17 wherein the memory tier comprises an off-chip memory.

Example 20

The machine-readable medium of Example 19 wherein the off-chip memory comprises one or more of a pooled memory node, a remote server node, and a high bandwidth memory (HBM).

Example 21

The machine-readable medium of Example 19 wherein demoting the first cache line includes communicating with the off-chip memory over a host fabric interface (HFI).

Example 22

The machine-readable medium of Example 22 further comprising program code to cause the machine to perform the operation of: communicating over a point-to-point link to specify the demotion of the first cache line.

Example 23

The machine-readable medium of Example 17 further comprising program code to cause the machine to perform the operation of:
communicating over an on-die interface (ODI) to specify the demotion of the first cache line.

Example 24

The machine-readable medium of Example 15 wherein the specified memory tier is identified in an immediate value, an operand, or within the CL demote instruction encoding.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a cache hierarchy including at least one Level 1 (L1) cache and one or more lower level caches;
   a decoder to decode a cache line (CL) demote instruction specifying at least a first cache line; and
   execution circuitry to demote the first cache line responsive to the decoded CL demote instruction, the execution circuitry to implement a writeback operation on the specified first cache line if the specified first cache line has been modified and homed in an instruction-specified memory tier or a default memory tier specified in a register.

2. The processor of claim 1 wherein the execution circuitry is to demote the first cache line from the L1 cache to a last level cache (LLC) or a Level 2 (L2) cache.

3. The processor of claim 1 wherein the memory tier comprises an off-chip memory.

4. The processor of claim 3 wherein the off-chip memory comprises one or more of a pooled memory node, a remote server node, a high capacity persistent memory, and a double data rate (DDR) memory.

5. The processor of claim 3 further comprising:
   a host fabric interface (HFI) to couple the processor to a memory fabric, the memory fabric coupled to nodes including the off-chip memory.

6. The processor of claim 5 further comprising:
   a point-to-point link to couple the processor to at least one additional processor.

7. The processor of claim 1 further comprising:
   an on-die interface (ODI) to couple the execution circuitry to cache/memory management circuitry of the specified memory tier.

8. The processor of claim 7 wherein the specified memory tier is identified in an immediate value, an operand, a status register, or within the CL demote instruction encoding.

9. A method comprising:
   decoding a cache line (CL) demote instruction specifying at least a first cache line; and
   executing the decoded CL demote instruction by demoting the specified at least first cache line and implementing a writeback operation on the first cache line if the first cache line has been modified and homed in an instruction-specified memory tier or a default memory tier specified in a register.

10. The method of claim 9 wherein the first cache line is to be demoted from a L1 cache to a last level cache (LLC) or a Level 2 (L2) cache.

11. The method of claim 9 wherein the memory tier comprises an off-chip memory.

12. The method of claim 11 wherein the off-chip memory comprises one or more of a pooled memory node, a remote server node, a high capacity persistent memory, and a double data rate (DDR) memory.

13. The method of claim 11 wherein demoting the first cache line includes communicating with the off-chip memory over a host fabric interface (HFI).

14. The method of claim 13 further comprising:
communicating over a point-to-point link to specify the demotion of the first cache line.

15. The method of claim 9 further comprising:
communicating over an on-die interface (ODI) to specify the demotion of the first cache line.

16. The method of claim 15 wherein the specified memory tier is identified in an immediate value, an operand, a status register, or within the CL demote instruction encoding.

17. A non-transitory machine-readable medium having program code stored thereon which, when executed by a machine, causes the machine to perform the operation of:
decoding a cache line (CL) demote instruction specifying at least a first cache line; and
executing the decoded CL demote instruction by demoting the specified at least first cache line and implementing a writeback operation on the first cache line if the first cache line has been modified and homed in an instruction-specified memory tier or a default memory tier specified in a register.

18. The non-transitory machine-readable medium of claim 17 wherein the first cache line is to be demoted from a L1 cache to a last level cache (LLC) or a Level 2 (L2) cache.

19. The non-transitory machine-readable medium of claim 17 wherein the memory tier comprises an off-chip memory.

20. The non-transitory machine-readable medium of claim 19 wherein the off-chip memory comprises one or more of a pooled memory node, a remote server node, a high capacity persistent memory, and a double data rate (DDR) memory.

21. The non-transitory machine-readable medium of claim 19 wherein demoting the first cache line includes communicating with the off-chip memory over a host fabric interface (HFI).

22. The non-transitory machine-readable medium of claim 21 further comprising program code to cause the machine to perform the operation of:
communicating over a point-to-point link to specify the demotion of the first cache line.

23. The non-transitory machine-readable medium of claim 17 further comprising program code to cause the machine to perform the operation of:
communicating over an on-die interface (ODI) to specify the demotion of the first cache line.

24. The non-transitory machine-readable medium of claim 23 wherein the specified memory tier is identified in an immediate value, an operand, or within the CL demote instruction encoding.

* * * * *